United States Patent
Chakraborty et al.

(10) Patent No.: US 10,805,979 B2
(45) Date of Patent: Oct. 13, 2020

(54) DUAL BAND DISCONTINUOUS RECEPTION

(71) Applicant: QUALCOMM Incorporated, San Diego, CA (US)

(72) Inventors: Kaushik Chakraborty, San Diego, CA (US); Rahul Malik, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/193,786

(22) Filed: Nov. 16, 2018

(65) Prior Publication Data

US 2019/0159280 A1    May 23, 2019

Related U.S. Application Data

(60) Provisional application No. 62/589,393, filed on Nov. 21, 2017.

(51) Int. Cl.
*H04W 76/28* (2018.01)
*H04W 52/02* (2009.01)
*H04W 76/15* (2018.01)

(52) U.S. Cl.
CPC ....... *H04W 76/28* (2018.02); *H04W 52/0216* (2013.01); *H04W 52/0235* (2013.01); *H04W 76/15* (2018.02)

(58) Field of Classification Search
CPC ......... H04W 52/0216; H04W 52/0235; H04W 76/15; H04W 76/28
See application file for complete search history.

(56) References Cited

U.S. PATENT DOCUMENTS

2010/0061284 A1*  3/2010  Chen ................. H04W 52/0229
                                                370/311
2014/0341129 A1* 11/2014  Zhu ..................... H04W 72/12
                                                370/329

(Continued)

FOREIGN PATENT DOCUMENTS

WO    WO-2016063113 A1    4/2016

OTHER PUBLICATIONS

International Search Report and Written Opinion—PCT/US2018/061798—ISA/EPO—dated Feb. 15, 2019.

(Continued)

*Primary Examiner* — Un C Cho
*Assistant Examiner* — Shah M Rahman
(74) *Attorney, Agent, or Firm* — Linda G. Gunderson; Holland & Hart LLP

(57) ABSTRACT

Methods, systems, and devices for wireless communications are described. Some wireless communications systems may support communications between a base station and a user equipment (UE) on multiple carriers. A UE may maintain a connection with a base station on a first carrier (e.g., an anchor carrier), and the UE may use a discontinuous reception (DRX) cycle on a second carrier. The DRX cycle may include scheduled on-durations during which the UE may monitor the second carrier for signaling from the base station. To reduce the power consumption at the UE associated with repeatedly monitoring scheduled on-durations, the base station may transmit wake-up signaling to the UE on the first carrier to identify the on-durations that include data from the base station. Accordingly, the UE may monitor these on-durations for the data and avoid monitoring other on-durations to limit power consumption.

98 Claims, 22 Drawing Sheets

(56) References Cited

U.S. PATENT DOCUMENTS

| | | | | |
|---|---|---|---|---|
| 2015/0003311 A1* | 1/2015 | Feuersaenger | ........ | H04W 76/28 370/311 |
| 2015/0327169 A1* | 11/2015 | Nigam | ............. | H04W 52/0209 370/311 |
| 2016/0128128 A1* | 5/2016 | Ang | ................. | H04W 52/0222 370/311 |
| 2016/0135215 A1* | 5/2016 | Wei | ................... | H04W 52/0206 370/329 |
| 2016/0192433 A1* | 6/2016 | Deenoo | ................ | H04W 76/28 370/329 |
| 2016/0255676 A1* | 9/2016 | Vajapeyam | ........... | H04W 16/14 370/329 |
| 2016/0286603 A1* | 9/2016 | Vajapeyam | ........... | H04W 74/08 |
| 2016/0294531 A1* | 10/2016 | Loehr | ............... | H04W 72/0446 |
| 2016/0323823 A1* | 11/2016 | Ryoo | .................. | H04W 52/0212 |
| 2017/0171820 A1* | 6/2017 | Kronestedt | .......... | H04W 16/14 |
| 2017/0238252 A1 | 8/2017 | Dalsgaard et al. | | |
| 2017/0311322 A1* | 10/2017 | Kim | ...................... | H04W 72/12 |
| 2017/0331670 A1* | 11/2017 | Parkvall | ............ | H04W 52/0245 |
| 2017/0339641 A1* | 11/2017 | Nigam | ............. | H04W 52/0216 |
| 2018/0184475 A1* | 6/2018 | Babaei | ................ | H04L 27/0006 |
| 2019/0045481 A1* | 2/2019 | Sang | .................... | H04B 1/7156 |
| 2019/0097874 A1* | 3/2019 | Zhou | ................... | H04B 7/0695 |
| 2020/0077338 A1* | 3/2020 | Sui | ..................... | H04W 52/0229 |

OTHER PUBLICATIONS

QUALCOMM Incorporated: "DRX for Dual Connectivity", 3GPP Draft; R2-144585_Dual_Connectivity DRX_87BIS, 3rd Generation Partnership Project (3GPP), Mobile Competence Centre; 650, Route Des Lucioles; F-06921 Sophia-Antipolis Cedex; France, vol. RAN WG2, No. Shanghai, China; Oct. 6, 2014-Oct. 10, 2014 Oct. 5, 2014 (Oct. 5, 2014), XP050876745, Retrieved from the Internet: URL:http://www.3gpp.org/ftp/Meetings_3GPP_SYNC/RAN2/Docs/ [retrieved on Oct. 5, 2014], 2 pages.

QUALCOMM Incorporated: "Further Discussion on WUS Configurations and Procedures", 3GPP Draft; R1-1720423, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017 (Nov. 18, 2017), XP051369986, Retrieved from the Internet: URL:http://www.3gpp.org/ftp/tsg%5Fran/WG1%5FRL1/TSGR1%5F91/Docs/ [retrieved on Nov. 18, 2017], 9 pages.

QUALCOMM Incorporated: "Wake-Up Schemes for DRX in NR", 3GPP Draft; R2-1700568 Wake-Up Proposal, 3rd Generation Partnership Project (3GPP), Mobile Competence Centre; 650, Route Des Lucioles; F-06921 Sophia-Antipolis Cedex; France, vol. RAN WG2, No. Spokane, US; Jan. 17, 2017-Jan. 19, 2017 Jan. 17, 2017 (Jan. 17, 2017), XP051211140, Retrieved from the Internet: URL:http://www.3gpp.org/ftp/Meetings_3GPP_SYNC/RAN2/Docs/ [retrieved on Jan. 17, 2017], 4 pages.

* cited by examiner

DUAL BAND DISCONTINUOUS RECEPTION

CROSS REFERENCES

The present application for patent claims the benefit of U.S. Provisional Patent Application No. 62/589,393 by CHAKRABORTY et al., entitled "DUAL BAND DISCONTINUOUS RECEPTION," filed Nov. 21, 2017, assigned to the assignee hereof, and expressly incorporated herein.

BACKGROUND

The following relates generally to wireless communication and more specifically to dual band discontinuous reception (DRX).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long-Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support communications between a base station and a UE on multiple carriers. For example, a wireless communications system may support communications between a base station and a UE on a high-band carrier and a low-band carrier. In some cases, the UE may monitor the multiple carriers continuously for signaling from the base station. In such cases, however, the power drain at the UE associated with monitoring the multiple carriers for signaling from the base station may be high, which may be detrimental to the battery life of the UE.

SUMMARY

Some wireless communications systems may support communications between a base station and a user equipment (UE) on multiple carriers. In some cases, a UE may maintain a connection with a base station on a first carrier that serves as an anchor carrier, and the UE may use a discontinuous reception (DRX) cycle on a second carrier. The DRX cycle may include scheduled on-durations during which the UE may monitor the second carrier for signaling from the base station. As described herein, to reduce the power consumption at the UE associated with repeatedly monitoring scheduled on-durations, the base station may transmit wake-up signaling to the UE on the first carrier to identify the on-durations that include data or control information from the base station. Accordingly, the UE may monitor these identified on-durations for the data, and the UE may avoid monitoring other on-durations to limit power consumption.

A method for wireless communication at a UE is described. The method may include monitoring a first carrier for wake-up signaling from a base station, the wake-up signaling being for a DRX cycle on a second carrier, receiving wake-up signaling on the first carrier prior to an on-duration in the DRX cycle, the wake-up signaling indicating a presence of data on the second carrier in the on-duration, and waking up for the on-duration to receive the data on the second carrier based on receiving the wake-up signaling.

An apparatus for wireless communication at a UE is described. The apparatus may include a processor, memory in electronic communication with the processor, and instructions stored in the memory. The instructions may be executable by the processor to cause the apparatus to monitor a first carrier for wake-up signaling from a base station, the wake-up signaling being for a DRX cycle on a second carrier, receive wake-up signaling on the first carrier prior to an on-duration in the DRX cycle, the wake-up signaling indicating a presence of data on the second carrier in the on-duration, and wake up for the on-duration to receive the data on the second carrier based on receiving the wake-up signaling.

Another apparatus for wireless communication at a UE is described. The apparatus may include means for monitoring a first carrier for wake-up signaling from a base station, the wake-up signaling being for a DRX cycle on a second carrier, receiving wake-up signaling on the first carrier prior to an on-duration in the DRX cycle, the wake-up signaling indicating a presence of data on the second carrier in the on-duration, and waking up for the on-duration to receive the data on the second carrier based on receiving the wake-up signaling.

A non-transitory computer-readable medium storing code for wireless communication at a UE is described. The code may include instructions executable by a processor to monitor a first carrier for wake-up signaling from a base station, the wake-up signaling being for a DRX cycle on a second carrier, receive wake-up signaling on the first carrier prior to an on-duration in the DRX cycle, the wake-up signaling indicating a presence of data on the second carrier in the on-duration, and wake up for the on-duration to receive the data on the second carrier based on receiving the wake-up signaling.

Some examples of the method, apparatuses, and non-transitory computer-readable medium described herein may further include operations, features, means, or instructions for monitoring the first carrier for the wake-up signaling using another DRX cycle. Some examples of the method, apparatuses, and non-transitory computer-readable medium described herein may further include operations, features, means, or instructions for extending an on-duration of the other DRX cycle used to monitor the first carrier for the wake-up signaling based on the first carrier being in the shared radio frequency spectrum band, where monitoring the first carrier for wake-up signaling using the other DRX cycle may be based on the extended on-duration.

Some examples of the method, apparatuses, and non-transitory computer-readable medium described herein may further include operations, features, means, or instructions for monitoring the first carrier for control information after receiving the wake-up signaling. Some examples of the method, apparatuses, and non-transitory computer-readable medium described herein may further include operations, features, means, or instructions for extending an on-duration of the other DRX cycle to monitor the first carrier for the control information based on receiving the wake-up signaling, where monitoring the first carrier for the control information may be based on the extended on-duration.

Some examples of the method, apparatuses, and non-transitory computer-readable medium described herein may further include operations, features, means, or instructions for receiving an indication of one or more control information monitoring occasions, where the extending may be based on the indicated one or more control information monitoring occasions. Some examples of the method, apparatuses, and non-transitory computer-readable medium described herein may further include operations, features, means, or instructions for transitioning to a sleep mode after receiving the wake-up signaling, and waking up to monitor the first carrier for the control information based on receiving the wake-up signaling.

Some examples of the method, apparatuses, and non-transitory computer-readable medium described herein may further include operations, features, means, or instructions for receiving an indication of one or more control information monitoring occasions, where the waking up may be based on the indicated one or more control information monitoring occasions. Some examples of the method, apparatuses, and non-transitory computer-readable medium described herein may further include operations, features, means, or instructions for receiving configuration information for a search space associated with the control information, where monitoring the first carrier for the control information may be based on the search space.

Some examples of the method, apparatuses, and non-transitory computer-readable medium described herein may further include operations, features, means, or instructions for receiving signaling indicating an absence of data in a subsequent on-duration, and avoiding waking up for the subsequent on-duration based on receiving the signaling indicating the absence of data in the subsequent on-duration. Some examples of the method, apparatuses, and non-transitory computer-readable medium described herein may further include operations, features, means, or instructions for failing to receive wake-up signaling on the first carrier prior to a subsequent on-duration in the DRX cycle, and avoiding waking up for the subsequent on-duration based on failing to receive the wake-up signaling.

Some examples of the method, apparatuses, and non-transitory computer-readable medium described herein may further include operations, features, means, or instructions for receiving reference signals from the base station on the second carrier in the on-duration of the DRX cycle, identifying a candidate beam for communications with the base station based on the received reference signals, and transmitting an indication of the candidate beam in a measurement report to the base station on uplink resources in the on-duration on the first carrier or the second carrier. Some examples of the method, apparatuses, and non-transitory computer-readable medium described herein may further include operations, features, means, or instructions for receiving an indication of a duration between the wake-up signaling received on the first carrier and the reference signals received on the second carrier.

In some examples of the method, apparatuses, and non-transitory computer-readable medium described herein, the reference signals include cell-specific reference signals or UE-specific reference signals. In some examples of the method, apparatuses, and non-transitory computer-readable medium described herein, the on-duration includes an extended on-duration. Some examples of the method, apparatuses, and non-transitory computer-readable medium described herein may further include operations, features, means, or instructions for receiving reference signals from the base station on the second carrier in the on-duration of the DRX cycle, failing to identify a candidate beam for communications with the base station based on the received reference signals, and transmitting an indication of the failure to identify the candidate beam to the base station on uplink resources in the on-duration on the first carrier or the second carrier.

Some examples of the method, apparatuses, and non-transitory computer-readable medium described herein may further include operations, features, means, or instructions for failing to gain access to a channel to transmit the indication of the failure to identify the candidate beam, and transmitting the indication of the failure to identify the candidate beam on scheduled or autonomous uplink resources. In some examples of the method, apparatuses, and non-transitory computer-readable medium described herein, the reference signals include cell-specific reference signals or UE-specific reference signals. In some examples of the method, apparatuses, and non-transitory computer-readable medium described herein, the on-duration includes an extended on-duration.

Some examples of the method, apparatuses, and non-transitory computer-readable medium described herein may further include operations, features, means, or instructions for receiving control information on the second carrier that schedules a transmission of the data from the base station on the second carrier in the on-duration. Some examples of the method, apparatuses, and non-transitory computer-readable medium described herein may further include operations, features, means, or instructions for receiving control information on the first carrier that schedules a transmission of the data from the base station on the second carrier in the on-duration. Some examples of the method, apparatuses, and non-transitory computer-readable medium described herein may further include operations, features, means, or instructions for receiving an indication from the base station to activate the DRX cycle on the second carrier, where the indication may be received on the first carrier, and activating the DRX cycle on the second carrier based on receiving the indication.

Some examples of the method, apparatuses, and non-transitory computer-readable medium described herein may further include operations, features, means, or instructions for failing to receive wake-up signaling on the first carrier for a predefined duration, determining that an inactivity timer associated with the DRX cycle may have expired based on failing to receive the wake-up signaling on the first carrier for the predefined duration, and deactivating the DRX cycle on the second carrier based on the determination. In some examples of the method, apparatuses, and non-transitory computer-readable medium described herein, the first carrier may be monitored in an active mode or another DRX cycle may be used on the first carrier.

In some examples of the method, apparatuses, and non-transitory computer-readable medium described herein, the first carrier includes a low frequency band carrier and the second carrier includes a high frequency band carrier. In some examples of the method, apparatuses, and non-transitory computer-readable medium described herein, the first carrier or the second carrier includes an unshared radio frequency spectrum band or a shared radio frequency spectrum band. In some examples of the method, apparatuses, and non-transitory computer-readable medium described herein, the unshared radio frequency spectrum band includes a radio frequency spectrum band licensed to a single operator, and the shared radio frequency spectrum band includes a radio frequency spectrum band that may be unlicensed, licensed to multiple operators, or licensed to a single operator with opportunistic access by other operators.

A method for wireless communication at a base station is described. The method may include configuring a first carrier and a second carrier for communications with a UE, identifying data to transmit to the UE on the second carrier, transmitting wake-up signaling on the first carrier prior to an on-duration in a DRX cycle used by the UE on the second carrier, the wake-up signaling indicating a presence of the data on the second carrier in the on-duration, and transmitting the data to the UE on the second carrier in the on-duration based on transmitting the wake-up signaling.

An apparatus for wireless communication at a base station is described. The apparatus may include a processor, memory in electronic communication with the processor, and instructions stored in the memory. The instructions may be executable by the processor to cause the apparatus to configure a first carrier and a second carrier for communications with a UE, identify data to transmit to the UE on the second carrier, transmit wake-up signaling on the first carrier prior to an on-duration in a DRX cycle used by the UE on the second carrier, the wake-up signaling indicating a presence of the data on the second carrier in the on-duration, and transmit the data to the UE on the second carrier in the on-duration based on transmitting the wake-up signaling.

Another apparatus for wireless communication at a base station is described. The apparatus may include means for configuring a first carrier and a second carrier for communications with a UE, identifying data to transmit to the UE on the second carrier, transmitting wake-up signaling on the first carrier prior to an on-duration in a DRX cycle used by the UE on the second carrier, the wake-up signaling indicating a presence of the data on the second carrier in the on-duration, and transmitting the data to the UE on the second carrier in the on-duration based on transmitting the wake-up signaling.

A non-transitory computer-readable medium storing code for wireless communication at a base station is described. The code may include instructions executable by a processor to configure a first carrier and a second carrier for communications with a UE, identify data to transmit to the UE on the second carrier, transmit wake-up signaling on the first carrier prior to an on-duration in a DRX cycle used by the UE on the second carrier, the wake-up signaling indicating a presence of the data on the second carrier in the on-duration, and transmit the data to the UE on the second carrier in the on-duration based on transmitting the wake-up signaling.

Some examples of the method, apparatuses, and non-transitory computer-readable medium described herein may further include operations, features, means, or instructions for performing a CCA procedure to gain access to a channel on the first carrier for a transmission opportunity for transmitting the wake-up signaling, where transmitting the wake-up signaling occurs in the transmission opportunity. Some examples of the method, apparatuses, and non-transitory computer-readable medium described herein may further include operations, features, means, or instructions for successfully gaining access to the channel on the first carrier based on performing the CCA procedure, and transmitting the wake-up signaling in the channel on the first carrier.

Some examples of the method, apparatuses, and non-transitory computer-readable medium described herein may further include operations, features, means, or instructions for failing to gain access to the channel on the first carrier, performing an early CCA procedure to gain access to the channel on the first carrier for a subsequent transmission opportunity for transmitting the wake-up signaling, successfully gaining access to the channel on the first carrier based on performing the early CCA procedure, and transmitting the wake-up signaling in the channel on the first carrier. Some examples of the method, apparatuses, and non-transitory computer-readable medium described herein may further include operations, features, means, or instructions for transmitting control information on the first carrier after transmitting the wake-up signaling.

In some examples of the method, apparatuses, and non-transitory computer-readable medium described herein, transmitting the control information may include operations, features, means, or instructions for transmitting the control information in the transmission opportunity used for transmitting the wake-up signaling. In some examples of the method, apparatuses, and non-transitory computer-readable medium described herein, transmitting the control information may include operations, features, means, or instructions for performing another CCA procedure to gain access to the channel on the first carrier for another transmission opportunity for transmitting the control information, and transmitting the control information in the other transmission opportunity for transmitting the control information.

Some examples of the method, apparatuses, and non-transitory computer-readable medium described herein may further include operations, features, means, or instructions for transmitting an indication of control information monitoring occasions to the UE. Some examples of the method, apparatuses, and non-transitory computer-readable medium described herein may further include operations, features, means, or instructions for transmitting configuration information for a search space associated with the control information, where the control information may be transmitted on the first carrier in the search space. Some examples of the method, apparatuses, and non-transitory computer-readable medium described herein may further include operations, features, means, or instructions for transmitting signaling indicating an absence of data in a subsequent on-duration.

Some examples of the method, apparatuses, and non-transitory computer-readable medium described herein may further include operations, features, means, or instructions for transmitting reference signals on the second carrier in the on-duration of the DRX cycle, and receiving an indication of a candidate beam selected by the UE for communications with the base station based on the reference signals, where the indication may be received in a measurement report on uplink resources in the on-duration on the first carrier or the second carrier. Some examples of the method, apparatuses, and non-transitory computer-readable medium described herein may further include operations, features, means, or instructions for transmitting an indication of a duration between the wake-up signaling transmitted on the first carrier and the reference signals transmitted on the second carrier.

In some examples of the method, apparatuses, and non-transitory computer-readable medium described herein, the reference signals include cell-specific reference signals or UE-specific reference signals. In some examples of the method, apparatuses, and non-transitory computer-readable medium described herein, the on-duration includes an extended on-duration. Some examples of the method, apparatuses, and non-transitory computer-readable medium described herein may further include operations, features, means, or instructions for transmitting reference signals on the second carrier in the on-duration of the DRX cycle, and receiving an indication that the UE failed to identify a candidate beam for communications with the base station based on the reference signals, where the indication may be received on uplink resources in the on-duration on the first carrier or the second carrier.

In some examples of the method, apparatuses, and non-transitory computer-readable medium described herein, the reference signals include cell-specific reference signals or UE-specific reference signals. In some examples of the method, apparatuses, and non-transitory computer-readable medium described herein, the on-duration includes an extended on-duration. Some examples of the method, apparatuses, and non-transitory computer-readable medium described herein may further include operations, features, means, or instructions for transmitting control information on the second carrier that schedules a transmission of the data to the UE on the second carrier in the on-duration.

Some examples of the method, apparatuses, and non-transitory computer-readable medium described herein may further include operations, features, means, or instructions for transmitting control information on the first carrier that schedules a transmission of the data to the UE on the second carrier in the on-duration. Some examples of the method, apparatuses, and non-transitory computer-readable medium described herein may further include operations, features, means, or instructions for transmitting an indication to the UE to activate the DRX cycle on the second carrier, where the DRX cycle may be activated by the UE based on the indication. In some examples of the method, apparatuses, and non-transitory computer-readable medium described herein, the first carrier may be monitored by the UE in an active mode or another DRX cycle may be used on the first carrier.

In some examples of the method, apparatuses, and non-transitory computer-readable medium described herein, the first carrier includes a low frequency band carrier and the second carrier includes a high frequency band carrier. In some examples of the method, apparatuses, and non-transitory computer-readable medium described herein, the first carrier or the second carrier includes an unshared radio frequency spectrum band or a shared radio frequency spectrum band. In some examples of the method, apparatuses, and non-transitory computer-readable medium described herein, the unshared radio frequency spectrum band includes a radio frequency spectrum band licensed to a single operator, and the shared radio frequency spectrum band includes a radio frequency spectrum band that may be unlicensed, licensed to multiple operators, or licensed to a single operator with opportunistic access by other operators.

DETAILED DESCRIPTION

Figure 1:
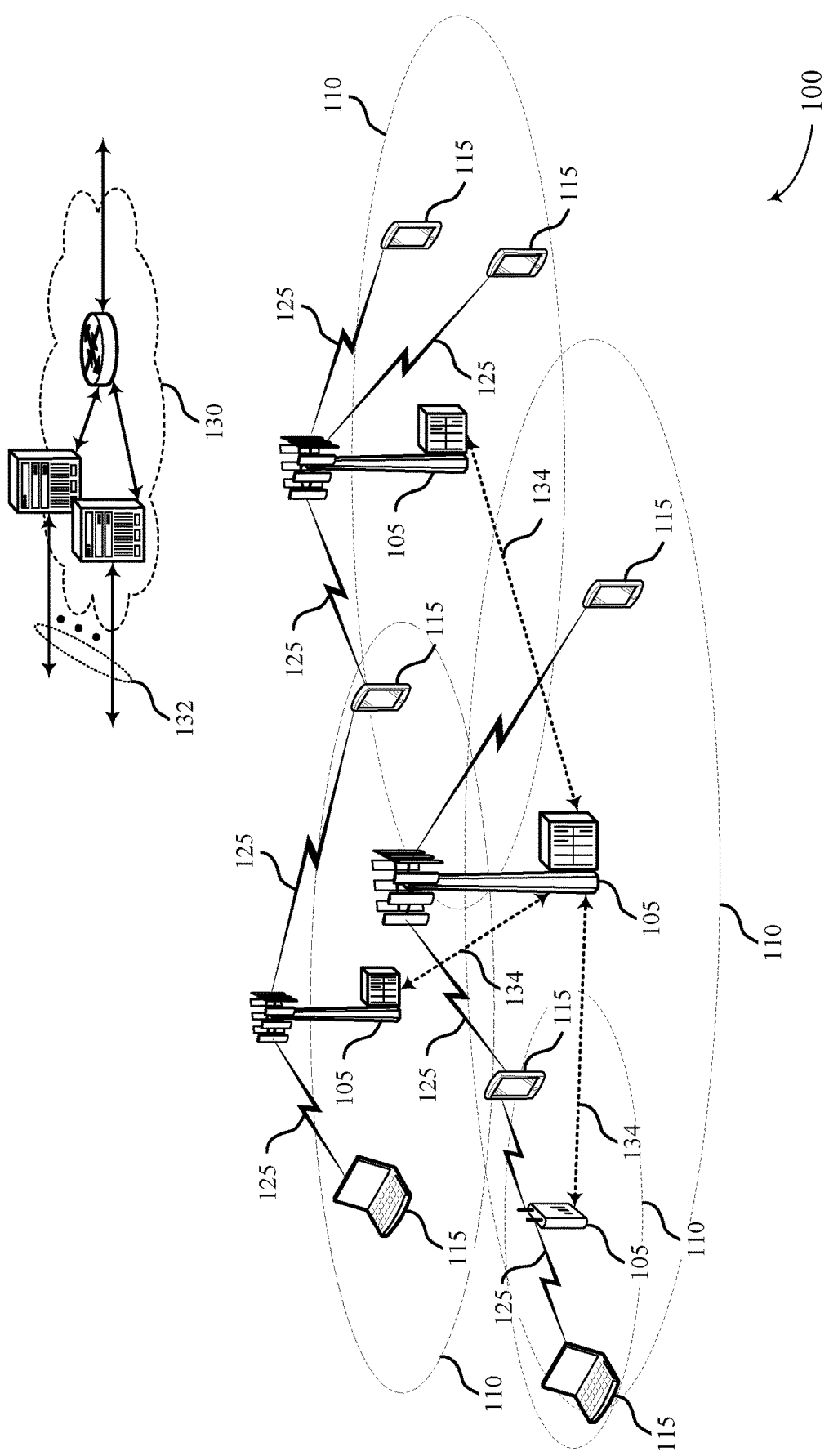
FIGS. 1 and 2 illustrate examples of wireless communications systems that support dual band discontinuous reception (DRX) in accordance with aspects of the present disclosure.

Some wireless communications systems may support communication between a base station and a user equipment (UE) on multiple cells or carriers, a feature which may be referred to as carrier aggregation, multi-carrier operation, or dual connectivity. For example, a base station and a UE may communicate on a high-band carrier (e.g., a millimeter wave (mmW) carrier) and a low-band carrier. One or both of the carriers may include licensed or unlicensed radio frequency bandwidths. The high-band carrier may be used by a UE to transmit or receive large amounts of data traffic relative to the low-band carrier. However, transmissions of large amount of data traffic on the high-band carrier may be infrequent and bursty. Because of the bursty nature of data traffic on the high-band carrier and the excessive amount of power used to monitor the high-band carrier, it may be appropriate to limit an amount of time spent by the UE monitoring the high-band carrier.

Accordingly, some deployments (e.g., non-standalone deployments) may support the use of a low-band carrier as an anchor carrier in addition to the high-band carrier, where the UE may, in some instances, monitor the low-band carrier and avoid monitoring the high-band carrier. For example, the UE may monitor the low-band carrier continuously and the UE may use a discontinuous reception (DRX) cycle on the high-band carrier. Although the use of a DRX cycle on the high-band carrier may reduce the power drain at the UE (e.g., compared to monitoring the high-band carrier continuously), the UE may still experience a high power drain each time the UE wakes up in an on-duration of the DRX cycle to monitor the high-band carrier for signaling from the base station. As such, when the UE wakes up to monitor the high-band carrier in an on-duration for signaling from the base station and there is no signaling transmitted by the base station in the on-duration, the power used to wake-up (e.g., to power up receiver circuitry) and monitor the high-band carrier may be wasted.

As described herein, a wireless communications system may support efficient techniques for limiting the power consumption at a UE operating in a DRX mode. In particular, a base station may transmit wake-up signaling on the low-band carrier to indicate the on-durations in a DRX cycle that include data for the UE. Accordingly, the UE may wake up to monitor the high-band carrier during the on-durations in the DRX cycle that include data for the UE, and the UE may avoid monitoring the high-band carrier during other on-durations in the DRX cycle. In some aspects, the UE may avoid monitoring the other on-durations in the DRX cycle based on receiving explicit signaling from the base station that indicates the absence of data in these on-durations or based on failing to receive wake-up signaling from the base station prior to these on-durations.

Aspects of the disclosure introduced above are described below in the context of a wireless communications system. Examples of processes and signaling exchanges that support dual band DRX are then described. Aspects of the disclosure are further illustrated by and described with reference to apparatus diagrams, system diagrams, and flowcharts that relate to dual band DRX.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may operate in an extremely-high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super-high frequency (SHF) or UHF transmissions. Techniques disclosed herein may be employed across transmissions that use one or more different frequency regions, and designated use of bands across these frequency regions may differ by country or regulating body.

Beamforming, which may also be referred to as spatial filtering, directional transmission, or directional reception, is a signal processing technique that may be used at a transmitting device or a receiving device in wireless communications system 100 (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

Time intervals of a communications resource in LTE or NR may be organized according to radio frames each having a duration of 10 milliseconds (ms). The radio frames may be identified by a system frame number (SFN) ranging from 0 to 1023. Each frame may include 10 subframes numbered from 0 to 9, and each subframe may have a duration of 1 ms.

A subframe may be further divided into 2 slots each having a duration of 0.5 ms, and each slot may contain 6 or 7 modulation symbol periods (e.g., depending on the length of the cyclic prefix prepended to each symbol period). In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, the numerology employed within a system (i.e., subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

In some cases, wireless communications system 100 may utilize both shared and unshared radio frequency spectrum bands. The unshared radio frequency spectrum band may be licensed to a single operator for use by that operator, and the shared radio frequency spectrum may be unlicensed, licensed to multiple operators, or licensed to a single operator with opportunistic access by other devices. Wireless communications system 100 may employ License Assisted Access (LAA), LTE-Unlicensed (LTE-U) radio access technology, or NR shared spectrum (NR-SS) technology in a shared radio frequency spectrum band such as the 5 GHz ISM band. When operating in shared radio frequency spectrum bands, wireless devices such as base stations 105 and UEs 115 may employ listen-before-talk (LBT) procedures to ensure a frequency channel is clear before transmitting data on the channel. In some cases, operations in shared radio frequency bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these.

Wireless communications system 100 may support communication with a UE 115 on multiple cells or carriers, a feature which may be referred to as carrier aggregation, multi-carrier operation, or dual connectivity. A UE 115 may be configured with multiple downlink carriers and one or more uplink carriers according to a carrier aggregation configuration. Each carrier may be configured for use in a shared or unshared radio frequency spectrum. In some cases, different carriers used for communication between a base station 105 and a UE 115 may be associated with different numerologies (e.g., symbol duration, TTI duration, etc.). As described herein, a base station 105 and a UE 115 may communicate using carrier aggregation or multi-carrier operation on a low frequency band carrier (e.g., a sub-6 GHz carrier) and a high frequency band carrier (e.g., a mmW carrier).

The high-band carrier may be used by a UE 115 to transmit or receive large amounts of data traffic relative to the low-band carrier. However, transmissions of large amount of data traffic on the high-band carrier may be infrequent and bursty. In one example, when a user of a UE 115 navigates to a webpage with a large amount of data embedded in the webpage (e.g., a 100 MB video file), the UE 115 may receive a large amount of data traffic to load the data embedded in the webpage. After the webpage is loaded, however, the UE 115 may receive minimal data traffic. In another example, a user of a UE 115 may initiate a session to stream a large file, where the UE 115 may receive a large amount of data traffic at a high rate while streaming. After the user exits the stream, however, the UE 115 may receive minimal data traffic. In yet another example, a user may initiate an application that may use a sustained amount of high data rates (e.g., augmented reality or virtual reality applications). After the user exits the application, however, the UE 115 may receive minimal data traffic.

Because of the bursty nature of data traffic on a high-band carrier and the excessive amount of power used to monitor the high-band carrier, it may be appropriate to limit an amount of time spent by a UE 115 monitoring the high-band carrier. Accordingly, some deployments (e.g., non-standalone deployments) may support the use of a low-band carrier as an anchor carrier in addition to the high-band carrier, where the UE 115 may, in some cases, monitor the low-band carrier and avoid monitoring the high-band carrier. For instance, the UE 115 may be configured to monitor the low-band carrier, and, when the base station 105 identifies data to transmit to the UE 115 on the high-band carrier, the base station 105 may transmit an activation command to the UE 115 on the low-band carrier for the UE 115 to establish a connection with the base station 105 on the high-band carrier and begin monitoring the high-band carrier for the data from the base station 105.

In some cases, a base station 105 may identify frequent bursts of data to transmit to a UE 115, and the base station 105 may transmit an activation message to the UE 115 for each data burst. In such cases, however, the overhead associated with the activation messages may be high. Thus, as described herein, instead of utilizing techniques for transmitting an activation message every time a base station 105 identifies data to transmit to the UE 115, a base station 105 in wireless communications system 100 may configure UE 115 to discontinuously monitor a high-band carrier based on a connected mode DRX (C-DRX) cycle. As such, the amount of time spent by the UE 115 monitoring the high-band carrier may be reduced (e.g., since the UE 115 may enter a sleep state in the C-DRX cycle), and the UE 115 may be able to wake up periodically to receive data from base station 105.

The use of a C-DRX cycle on the high-band carrier may therefore limit power consumption at a UE 115 while providing opportunities for the UE 115 to receive data from a base station on the high-band carrier (e.g., without the overhead of activation messages on the low-band carrier). However, the UE 115 may still experience a high power-drain while using C-DRX each time the UE 115 wakes up to monitor the high-band carrier for data from the base station. As such, when the UE 115 wakes up to monitor the high-band carrier for data from the base station and there is no data to be received from the base station, the power used to wake-up (e.g., to power up receiver circuitry) and monitor the high-band carrier may be wasted. Wireless communications system 100 may support efficient techniques for further limiting the power consumption at a UE 115 by supporting wake-up signaling on the low-band carrier. In particular, a base station 105 in wireless communications system 100 may transmit wake-up signaling on the low-band carrier to indicate to the UE 115 when to wake up in a C-DRX cycle to receive data on the high-band carrier.

Figure 2:
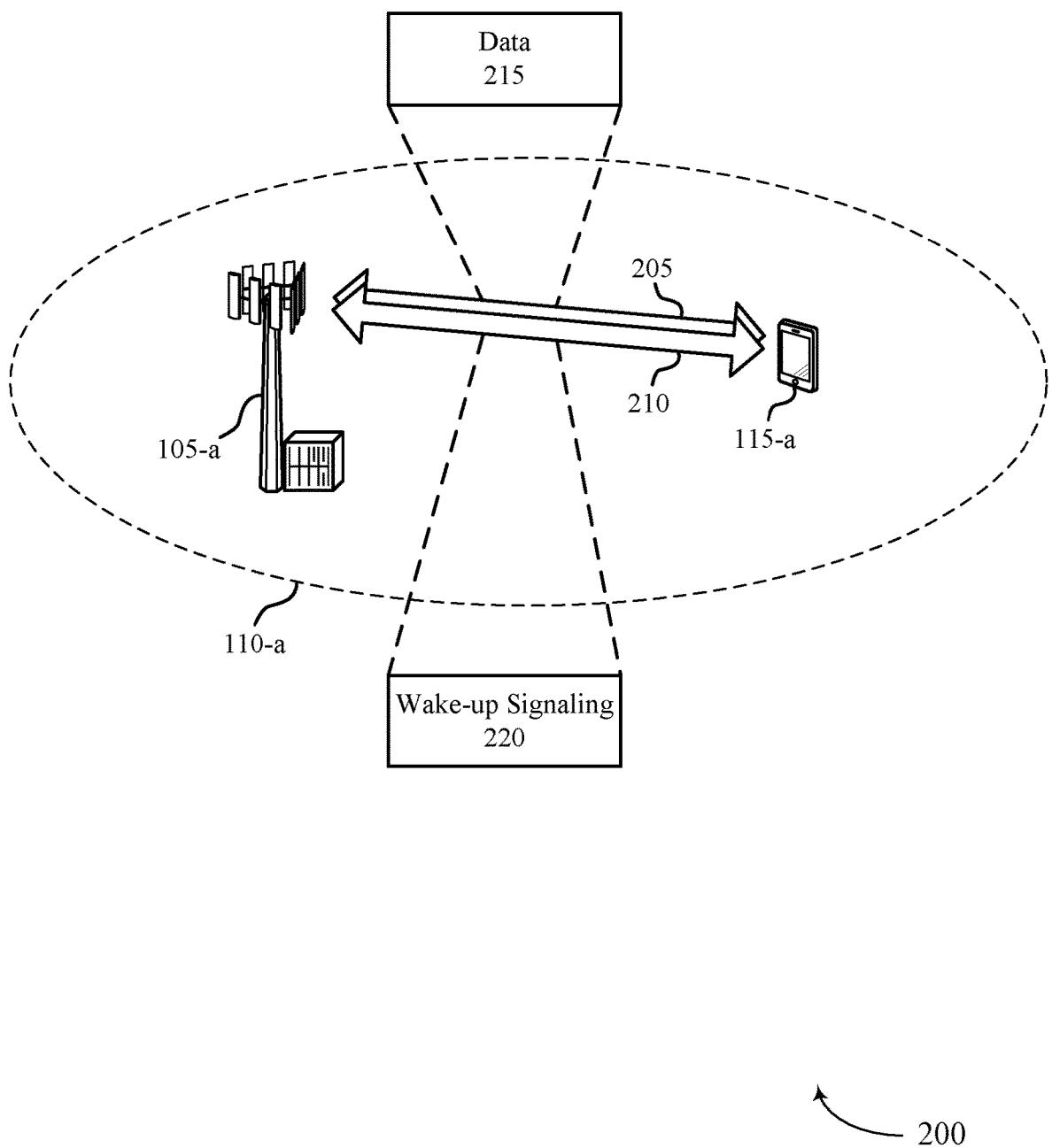

FIG. 2 illustrates an example of a wireless communications system 200 in accordance with aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. Although the examples described below are related to downlink communications, it is to be understood that the techniques may be applied for uplink communications, where UE 115-a may transmit uplink data in a physical uplink shared channel (PUSCH). Wireless communications system 200 may support aspects of wireless communications system 100. For example, wireless communications system may support carrier aggregation, where base station 105-a may communicate with UE 115-a on multiple carriers, such as a first carrier 205 and a second carrier 210. In the examples described herein, first carrier 205 may be a high-band carrier 205 as discussed with reference to FIG. 1, and second carrier 210 may be a low-band carrier 210 as discussed with reference to FIG. 1. In other examples, however, first carrier 205 and second carrier 210 may correspond to other carriers.

High-band carrier 205 may be used by base station 105-a to transmit large amounts of data traffic to UE 115-a, and low-band carrier 210 may be used by base station 105-a to transmit other data traffic to UE 115-a. Low-band carrier 210 may be an anchor carrier used by UE 115-a to maintain a connection with base station 105-a. In some examples, UE 115-a may monitor low-band carrier 210 actively (e.g., continuously), and UE 115-a may monitor high-band carrier 205 discontinuously based on a C-DRX cycle. In other examples, UE 115-a may monitor low-band carrier 210 discontinuously based on another C-DRX cycle (as described in further detail below). As described with reference to FIG. 1, the use of a C-DRX cycle on the high-band carrier 205 may limit power consumption at UE 115-a while providing opportunities for UE 115-a to receive data from a base station 105-a on high-band carrier 205. However, UE 115-a may still experience a high power-drain while using C-DRX each time the UE 115-a wakes up to monitor the high-band carrier 205 (or any carrier) for data from base station 105-a. In addition, in a mmW deployment, it may be appropriate for UE 115-a to perform beam management to identify an appropriate beam for communicating with base station 105-a each time the UE 115-a wakes up. In such cases, the UE 115-a may experience an even higher power drain as the UE 115-a may have to perform measurements and support additional signaling in a beam management procedure.

To further limit the power consumption at UE 115-a, base station 105-a may support techniques for transmitting wake-up signaling 220 on the low-band carrier 210 to indicate to UE 115-a when to wake up in a C-DRX cycle to receive data 215 on the high-band carrier 205 from base station 105-a. In particular, the wake-up signaling 220 may identify the on-durations that include data for the UE 115-a. Thus, UE 115-a may monitor these on-durations based on receiving wake-up signaling 220 on the low-band carrier 210 prior to these on-durations, and UE 115-a may avoid monitoring other scheduled on-durations. In some cases, base station 105-a may transmit signaling prior to an on-duration to indicate the absence of data in the on-duration. In such cases, UE 115-a may receive the signaling and avoid waking up in the on-duration. In other cases, base station 105-a may avoid transmitting signaling for a scheduled on-duration when there is no data for UE 115-a to receive in the scheduled on-duration. In such cases, when UE 115-a fails to receive the signaling, the UE 115-a may avoid waking up in the on-duration.

Figure 3:
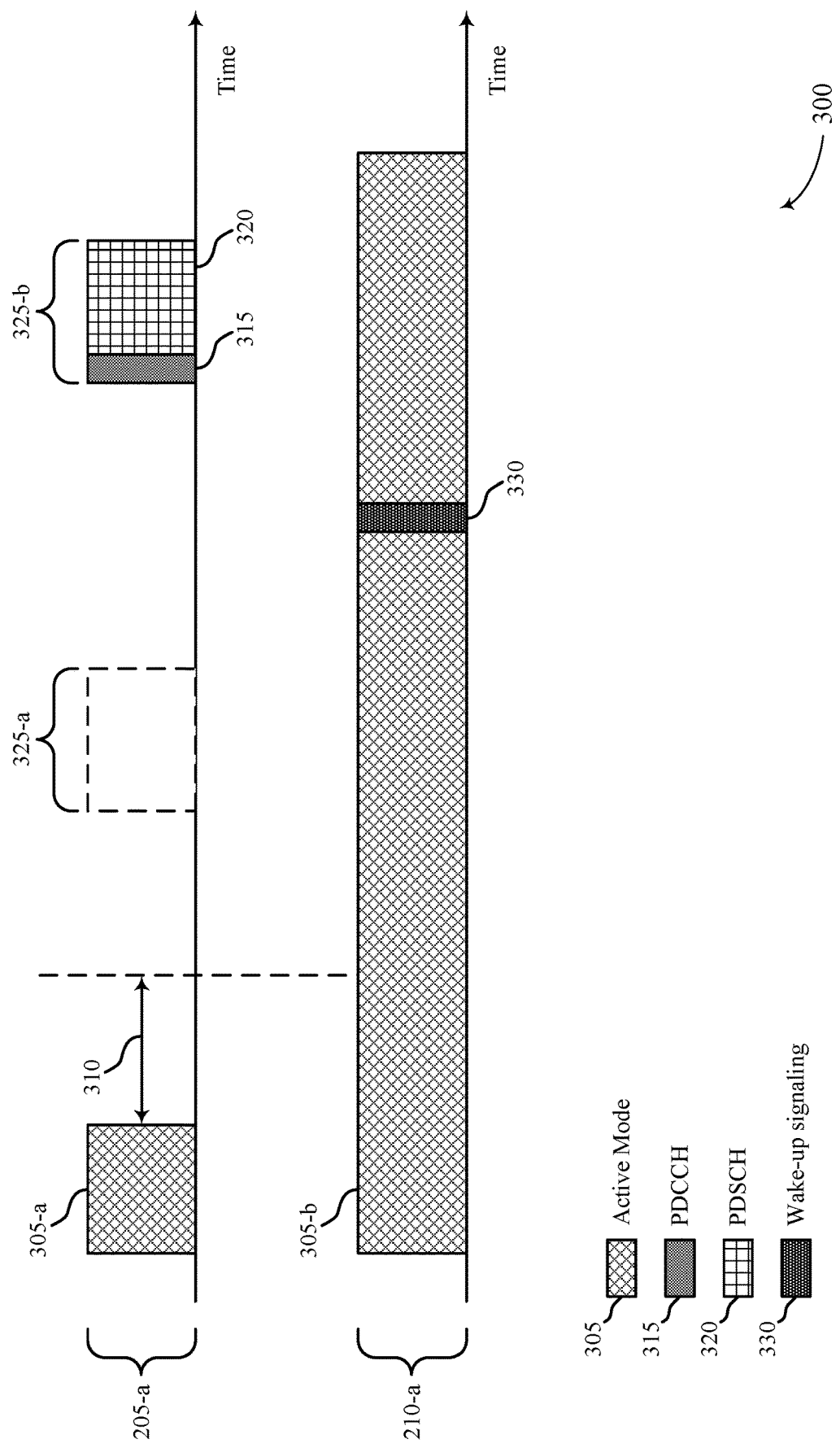
FIG. 3 illustrates an example of resources used to transmit wake-up signaling for a DRX cycle to a user equipment (UE) in accordance with aspects of the present disclosure.

FIG. 3 illustrates an example of resources 300 used to transmit wake-up signaling 330 on a low-band carrier 210-a for a C-DRX cycle used by UE 115-a on a high-band carrier 205-a in accordance with aspects of the present disclosure. In the example of FIG. 3, base station 105-a may identify data to transmit to UE 115-a on high-band carrier 205-a, and base station 105-a may transmit an activation command to UE 115-a for UE 115-a to establish a connection with the base station 105-a on the high-band carrier 205-a and begin monitoring the high-band carrier 205-a for the data from base station 105-a. Base station 105-a may then transmit the data to UE 115-a during active mode 305-a on the high-band carrier 205-a. In some cases, after the original data transmission, there may be no further communications on the high-band carrier 205-a between base station 105-a and UE 115-a for a time period 310. In such cases, an inactivity timer monitored by UE 115-a may expire after time period 310, and UE 115-a may determine to activate a C-DRX mode on high-band carrier 205-a.

In the C-DRX mode, UE 115-a may be scheduled to monitor the high-band carrier 205-a discontinuously at recurring on-durations 325-a. As described herein, base station 105-a may transmit wake-up signaling on low-band carrier 210-a to UE 115-a to indicate the on-durations for UE 115-a to monitor for data from base station 105-a. Prior to on-duration 325-a, base station 105-a may not have data to transmit to UE 115-a. As such, in some cases, base station 105-a may avoid transmitting wake-up signaling to UE 115-a prior to on-duration 325-a (as shown), and UE 115-a may avoid waking up to monitor high-band carrier 205-a during on-duration 325-a based on failing to receive wake-up signaling prior to on-duration 325-a. In other cases, base station 105-a may transmit signaling to UE 115-a to indicate the absence of data in on-duration 325-a (not shown), and UE 115-a may avoid monitoring high-band carrier 205-a during on-duration 325-a based on the signaling.

After on-duration 325-a, base station 105-a may identify data to transmit to UE 115-a. Accordingly, base station 105-a may transmit wake-up signaling 330 to UE 115-a, and UE 115-a may receive the wake-up signaling 330 and determine to wake up to monitor high-band carrier 205-a during on-duration 325-b based on wake-up signaling 330. Base station 105-a may then transmit PDCCH 315 in on-duration 325-b to schedule a data transmission to UE 115-a in PDSCH 320, and base station 105-a may transmit the data in PDSCH 320. UE 115-a may receive the control information in PDCCH 315 scheduling the data transmission in PDSCH 320, and UE 115-a may receive the data in PDSCH 320.

The on-durations 325 illustrated in FIG. 3 may correspond to on-durations 325 in a short C-DRX mode. After a period of inactivity on high-band carrier 205-a, UE 115-a may transition to a long C-DRX mode where a duration between the on-durations may be longer than a duration between on-durations in a short C-DRX mode. It is to be understood that the techniques described herein for receiving wake-up signaling on low band carrier 210-a indicating whether UE 115-a is to monitor high band carrier 205-a during a scheduled on-duration of a C-DRX cycle applies for both a short DRX mode and a long DRX mode. After another period of inactivity, UE 115-a may deactivate the C-DRX mode and enter an idle mode DRX. In idle mode DRX, UE 115-a may monitor the channel infrequently (e.g., compared to the long C-DRX mode) for paging from base station 105-a. If UE 115-a receives paging from base station 105-a, UE 115-a may activate another active mode on high-band carrier 205-a to communicate with base station 105-a. Thus, the UE 115-a may transition from an active mode to a C-DRX mode, then to an idle mode, and back to an active mode on high-band carrier 205-a.

Figure 4:
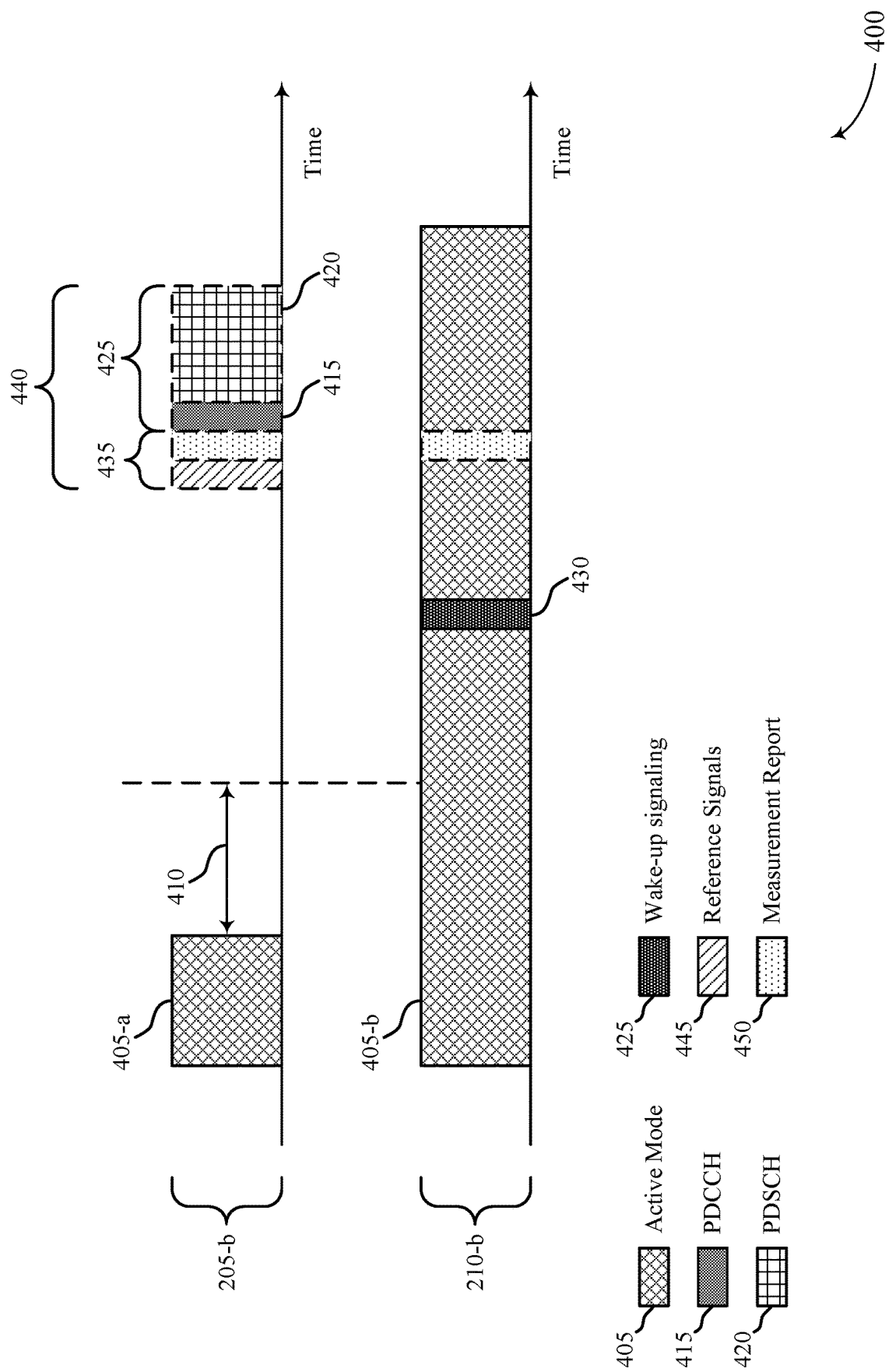
FIGS. 4 and 5 illustrate examples of signaling for beam management procedures in accordance with aspects of the present disclosure.
Figure 5:
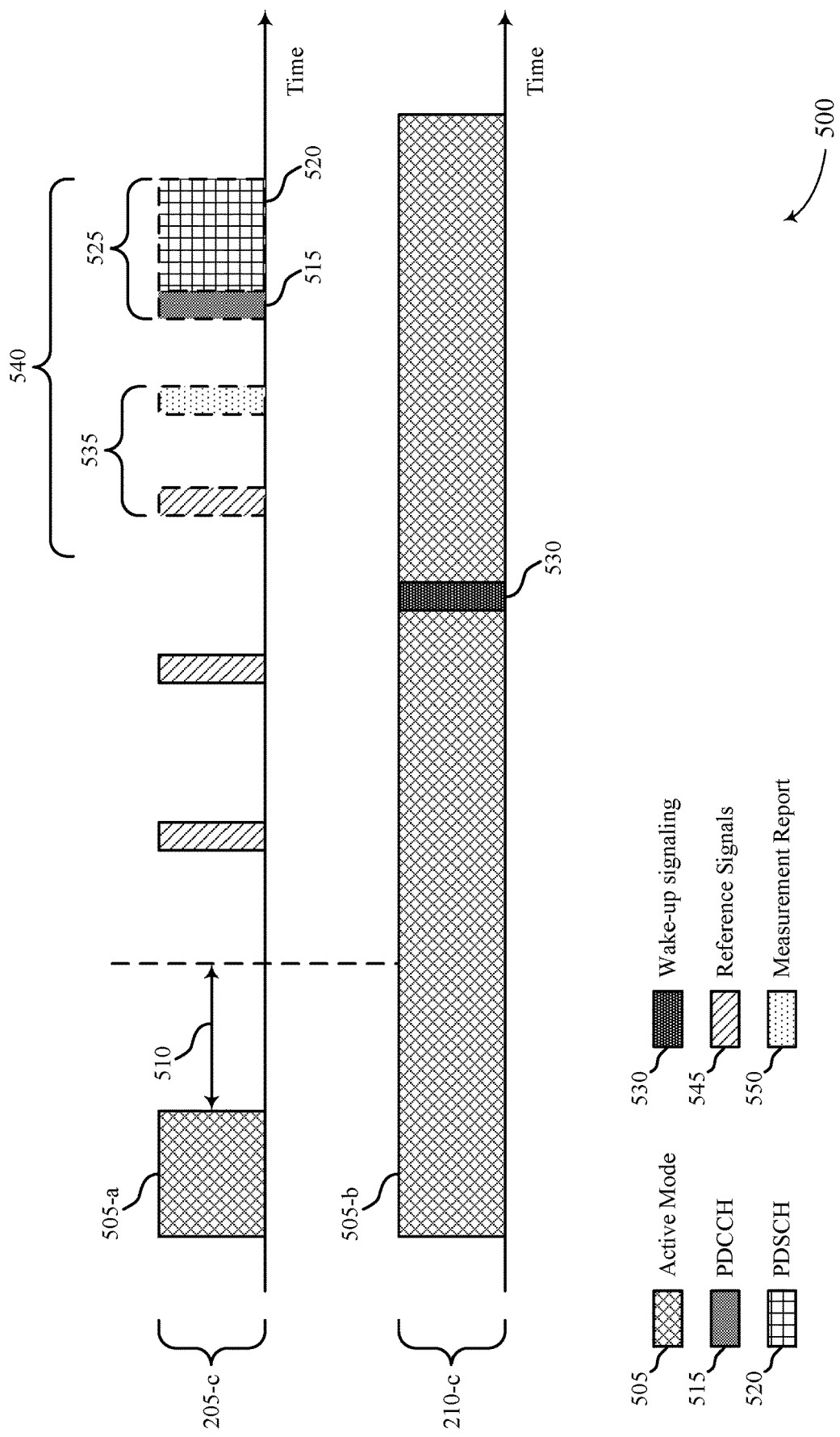

In some cases, base station 105-a may transmit the control information in PDCCH 315 and the data in PDSCH 320 using a previously configured beam (e.g., a beam identified for communication in active mode 305). However, if base station 105-a is not in communication with UE 115-a for an extended period of time, the quality of a beam (e.g., a transmit beam and a receive beam) configured for communications between base station 105-a and UE 115-a may degrade. In such cases, if a base station 105-a is configured to transmit data to UE 115 in an on-duration using a previously configured beam, the quality of the data transmission may be low (e.g., the signal-to-interference-plus-noise ratio (SINR) may be low). As described herein, a base station 105-a and UE 115-a may support efficient signaling to identify a suitable beam for communications in an on-duration. FIGS. 4 and 5 illustrate examples of such signaling 400 and 500 used for identifying a suitable beam for communications between a base station 105-a and a UE 115-a in an on-duration.

In the example of FIG. 4, base station 105-a may identify data to transmit to UE 115-a on high-band carrier 205-b, and base station 105-a may transmit an activation command to UE 115-a for UE 115-a to establish a connection with the base station 105-a on the high-band carrier 205-b and begin monitoring the high-band carrier 205-b for the data from base station 105-a. Base station 105-a may then transmit the data to UE 115-a during active mode 405-a on the high-band carrier 205-b. In some cases, after the original data transmission, there may be no further communications on the high-band carrier 205-b between base station 105-a and UE 115-a for a time period 410. In such cases, an inactivity timer monitored by UE 115-a may expire after time period 410, and UE 115-a may determine to activate a C-DRX mode on high-band carrier 205-b.

In the C-DRX mode, UE 115-a may be scheduled to monitor the high-band carrier 205-b discontinuously at recurring on-durations. As described herein, base station 105-a may transmit wake-up signaling on low-band carrier 210-a to UE 115-a to indicate on-durations for UE 115-a to monitor for data from base station 105-a. Prior to on-duration 425, base station 105-a may identify data to transmit to UE 115-a. Accordingly, base station 105-a may transmit wake-up signaling 430 to UE 115-a for UE 115-a to wake up in on-duration 425. UE 115-a may receive wake-up signaling 430 and may wake up to monitor high-band carrier 205-a in on-duration 425 based on wake-up signaling 430. As discussed above, however, before monitoring for control and data information from base station 105-a during on-duration 425, it may be appropriate for base station 105-a and UE 115-a to perform a beam management procedure during time period 435 to identify an appropriate beam for communications in on-duration 425. Thus, the on-duration may be extended (as represented by extended on-duration 440).

In the example of FIG. 4, base station 105-a may transmit UE-specific reference signals 445 to UE 115-a on multiple beams to allow UE 115-a to identify an appropriate beam for communications with base station 105-a in on-duration 425. UE 115-a may receive the reference signals 445 and may identify a candidate beam for communicating with base station 105-a in on-duration 425. The candidate beam may be associated with the highest reliability of all the beams available to base station 105-a and UE 115-a. UE 115-a may then transmit an indication of the candidate beam to base station 105-a in a measurement report 450 on the high-band carrier 205-b or on low-band carrier 205-b. Base station 105-a may receive the measurement report 450 and base station 105-a may identify the candidate beam selected by UE 115-a.

Base station 105-a may then transmit PDCCH 415 using the candidate beam in on-duration 425 to schedule a data transmission to UE 115-a in PDSCH 420 in on-duration 425, and base station 105-a may transmit the data in PDSCH 420. Subsequently, UE 115-a may receive the data in PDSCH 420 using the candidate beam based on the control information received in PDCCH 415. Although FIG. 4 illustrates that the control information may be transmitted in PDCCH 415 on high-band carrier 205-b, in other examples, the control information may be transmitted in PDCCH 415 on low-band carrier 210-b. In some cases, the resources used by base station 105-a to transmit the UE-specific reference signals 445 to UE 115-a and the resources used by UE 115-a to transmit the measurement report 450 to base station 105-a may be pre-configured. For example, UE 115-a may be pre-configured to monitor a certain set of resources prior to on-duration 425 for the UE-specific reference signals 445, and the UE 115-a may be pre-configured to transmit the measurement report 450 to base station 105-a on another set of resources prior to on-duration 425.

In some aspects, UE 115-a may wake up for the extended on-duration 440 and may fail to detect reference signals on high-band carrier 205-b or may fail to detect a beam having reasonable quality (e.g., associated with an SINR that is above a certain threshold) based on reference signals received on high band carrier 205-b. Alternatively, UE 115-a may wake-up for the extended on-duration 440 and may fail to detect control information in PDCCH 415 or data in PDSCH 420. In both cases, a beam failure event may be triggered. Such a beam failure event may occur when UE 115-a is no longer in a coverage area of a mmW cell due to mobility, orientation change, or other factors. After the beam failure event is triggered, UE 115-a may initiate a beam recovery procedure. As part of the beam recovery procedure, UE 115-a may transmit an indication (e.g., on high-band carrier 205-b or low-band carrier 210-b) to base station 105-a that the UE 115-a failed to identify a candidate beam for communications with base station 105-a or that the UE 115-a failed to receive control information in PDCCH 415 or data in PDSCH 420. UE 115-a may then communicate with base station 105-a to attempt to re-establish a connection on high-band carrier 205-b to receive the data intended for UE 115-a.

In the example of FIG. 5, base station 105-a may identify data to transmit to UE 115-a on high-band carrier 205-c, and base station 105-a may transmit an activation command to UE 115-a for UE 115-a to establish a connection with the base station 105-a on the high-band carrier 205-c and begin monitoring the high-band carrier 205-c for the data from base station 105-a. Base station 105-a may then transmit the data to UE 115-a during active mode 505 on high-band carrier 205-c. In some cases, after the original data transmission, there may be no further communications on the high-band carrier 205-c between base station 105-a and UE 115-a for a time period 510. In such cases, an inactivity timer monitored by UE 115-*a* may expire after time period 510, and UE 115-*a* may determine to activate a C-DRX mode on high-band carrier 205-*c*.

In the C-DRX mode, UE 115-*a* may be scheduled to monitor the high-band carrier 205-*c* discontinuously at recurring on-durations. As described herein, base station 105-*a* may transmit wake-up signaling on low-band carrier 210-*c* to UE 115-*a* to indicate the on-durations for UE 115-*a* to monitor for data from base station 105-*a*. Prior to on-duration 525, base station 105-*a* may identify data to transmit to UE 115-*a*. Accordingly, base station 105-*a* may transmit wake-up signaling 530 to UE 115-*a* for UE 115-*a* to wake up in on-duration 525. UE 115-*a* may receive wake-up signaling 530 and may wake up to monitor high-band carrier 205-*c* in on-duration 525 based on wake-up signaling 530. As discussed above, however, before monitoring for control and data information from base station 105-*a* during on-duration 525, it may be appropriate for base station 105-*a* and UE 115-*a* to perform a beam management procedure during time period 535 to identify an appropriate beam for communications in on-duration 525. Thus, the on-duration may be extended (as represented by extended on-duration 540).

In the example of FIG. 5, base station 105-*a* may transmit (e.g., broadcast) cell specific reference signals 545 (e.g., synchronization signals) on high-band carrier 205-*c*. In some cases, the cell-specific reference signals 545 may be transmitted periodically (as illustrated). The cell-specific reference signals may be transmitted on multiple beams such that UE 115-*a* may be able to identify an appropriate beam for communications with base station 105-*a* in on-duration 525. UE 115-*a* may receive the reference signals 545 and may identify a candidate beam for communications with base station 105-*a* in on-duration 525 based on the reference signals 545. The candidate beam may be associated with the highest reliability of all the beams available to base station 105-*a* and UE 115-*a*. UE 115-*a* may then transmit an indication of the candidate beam to base station 105-*a* in a measurement report 550 on the high-band carrier 205-*c* or on low-band carrier 205-*c*. Base station 105-*a* may receive the measurement report 550 and may identify the candidate beam selected by UE 115-*a*.

Base station 105-*a* may then transmit PDCCH 515 using the candidate beam in on-duration 525 to schedule a data transmission to UE 115-*a* in PDSCH 520 in on-duration 525, and base station 105-*a* may transmit the data in PDSCH 520. UE 115-*a* may then receive the data in PDSCH 520 using the candidate beam based on the control information received in PDCCH 515. Although FIG. 5 illustrates that the control information is transmitted in PDCCH 515 on high-band carrier 205-*c*, in other examples, the control information may be transmitted in PDCCH 515 on low-band carrier 210-*c*. In some cases, the location of the resources used by base station 105-*a* to transmit the cell-specific reference signals 545 may be predetermined independent of the location of the on-duration 525.

Similarly, the location of the resources used by UE 115-*a* to transmit the measurement report 550 may be resources configured independent of the location of the on-duration 525 (e.g., scheduling request resources or random-access channel (RACH) resources). Thus, the wake-up signaling may be transmitted prior to on-duration 525 based on the location of the pre-configured resources used to transmit the reference signals 545 and the location of the pre-configured resources used to transmit the measurement report 550. In particular, the wake-up signaling may be transmitted before at least some reference signals are transmitted on high-band carrier 205-*c* and before a location of a set of uplink resources available to transmit the measurement report (e.g., where the reference signals 545 are transmitted before on-duration 525 and the uplink resources are available before on-duration 525).

In some aspects, UE 115-*a* may wake up for the extended on-duration 540 and may fail to detect reference signals on high-band carrier 205-*c* or may fail to detect a beam having reasonable quality (e.g., associated with an SINR that is above a certain threshold) based on reference signals received on high band carrier 205-*c*. Alternatively, UE 115-*a* may wake up for the extended on-duration 540 and may fail to detect control information in PDCCH 515 or data in PDSCH 520. In such cases, a beam failure event may be triggered. Such a beam failure event may occur when UE 115-*a* is no longer in a coverage area of a mmW cell due to mobility, orientation change, or other factors. After the beam failure event is triggered, UE 115-*a* may initiate a beam recovery procedure. As part of the beam recovery procedure, UE 115-*a* may transmit an indication (e.g., on high-band carrier 205-*c* or low-band carrier 210-*c*) to base station 105-*a* that UE 115-*a* failed to identify a candidate beam for communications with base station 105-*a* or that UE 115-*a* failed to receive control information in PDCCH 515 or data in PDSCH 520. UE 115-*a* may then communicate with base station 105-*a* to attempt to re-establish a connection on high-band carrier 205-*c* to receive the data intended for UE 115-*a*.

Figure 6:
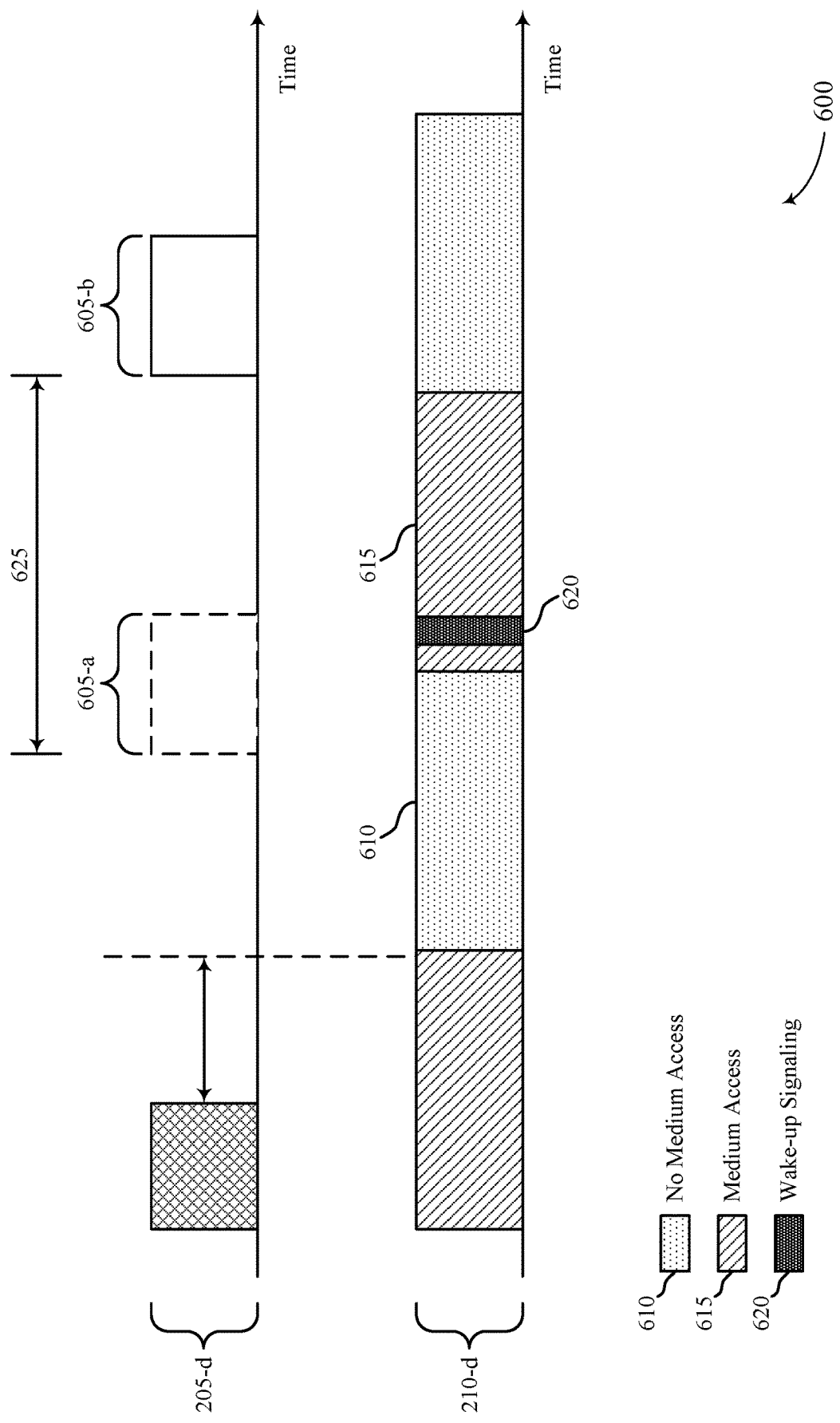
FIG. 6 illustrates an example of communications on a high-band carrier in an unshared radio frequency spectrum and on a low-band carrier in a shared radio frequency spectrum in accordance with aspects of the present disclosure.

Although FIGS. 3-5 illustrate examples of communications on high-band carrier 205 and low-band carrier 210 in an unshared radio frequency spectrum, in other examples, high-band carrier 205 and/or low-band carrier 210 may be configured for use in a shared radio frequency spectrum. For example, FIG. 6 illustrates an example of communications on a high-band carrier 205-*d* in an unshared radio frequency spectrum and on a low-band carrier 210-*d* in a shared radio frequency spectrum in accordance with aspects of the present disclosure. UE 115-*a* may communicate with base station 105-*a* in an active mode on high-band carrier 205-*d* before transitioning to a DRX mode on high-band carrier 205-*d*. After transitioning to the DRX mode on high-band carrier 205-*d*, UE 115-*a* may be scheduled to wake up periodically during on-durations 605 to communicate with base station 105-*a*. As described herein, however, UE 115-*a* may wake up during a scheduled on-duration 605 after receiving wake-up signaling on low-band carrier 210-*d* indicating the presence of data in the on-duration 605.

In the example of FIG. 6, base station 105-*a* may identify, in a period 610 during which base station 105-*a* may not have access to low-band carrier 210-*d*, data to transmit to UE 115-*a*. Thus, prior to transmitting wake-up signaling on low-band carrier 210-*d*, base station 105-*a* may contend to access low-band carrier 210-*d* (e.g., using an LBT procedure). Base station 105-*a* may gain access to low-band carrier 210-*d* in period 615, and base station 105-*a* may then transmit wake-up signaling 620 in period 615. Because base station 105-*a* may have to wait until period 615 to transmit the wake-up signaling 620 (i.e., after identifying the data to transmit in period 610), the data transmission may be delayed. In particular, rather than transmitting the wake-up signaling 620 in period 610 for a data transmission in on-duration 605-*a*, base station 105-*a* may transmit the wake-up signaling 620 in period 615 for a data transmission in on-duration 605-*b*. Thus, the data transmission may be delayed by a time period 625.

In some cases, the data transmission may be further delayed due to a delay in a beam management procedure caused by the low-band carrier 210-*d* being in a shared radio frequency spectrum. For example, if UE 115-*a* is configured to transmit a measurement report to base station 105-*a* on low-band carrier 210-*d*, UE 115-*a* may have to gain access to low-band carrier 210-*d* prior to transmitting the measurement report. As a result, the transmission of the measurement report may be delayed, and the data transmission may be further delayed. Thus, a transmission in an on-duration of the high-band carrier 205-*d* may be delayed until base station 105-*a* is able to gain access to low-band carrier 210-*d* to transmit wake-up signaling and/or until UE 115-*a* is able to gain access to low-band carrier 210-*d* to transmit a measurement report. Similarly, if high-band carrier 205-*d* is configured for use in a shared radio frequency spectrum, base station 105-*a* may have to gain access to high-band carrier 205-*d* to transmit reference signals for a beam management procedure and to transmit control information and data to UE 115-*a*. Thus, the transmission of the reference signals, control information, and data may be delayed until the base station 105-*a* is able to gain access to high-band carrier 205-*d*.

Further, although the examples above describe that UE 115-*a* may monitor a low-band carrier 210 in an active mode (e.g., active modes 305-*b*, 405-*b*, and 505-*b* described with reference to FIGS. 3, 4, and 5, respectively), in other examples, UE 115-*a* may be configured to monitor low-band carrier 210 discontinuously based on a C-DRX cycle. In such examples, when base station 105-*a* identifies data to transmit to UE 115-*a*, base station 105-*a* may have to wait until a next on-duration of the C-DRX cycle on the low-band carrier 210 to transmit wake-up signaling to UE 115-*a*. Accordingly, a transmission in an on-duration of the high-band carrier 205 may be delayed until the base station 105-*a* is able to transmit the wake-up signaling on low-band carrier (i.e., in an on-duration of the C-DRX cycle on low-band carrier 210).

Figure 7:
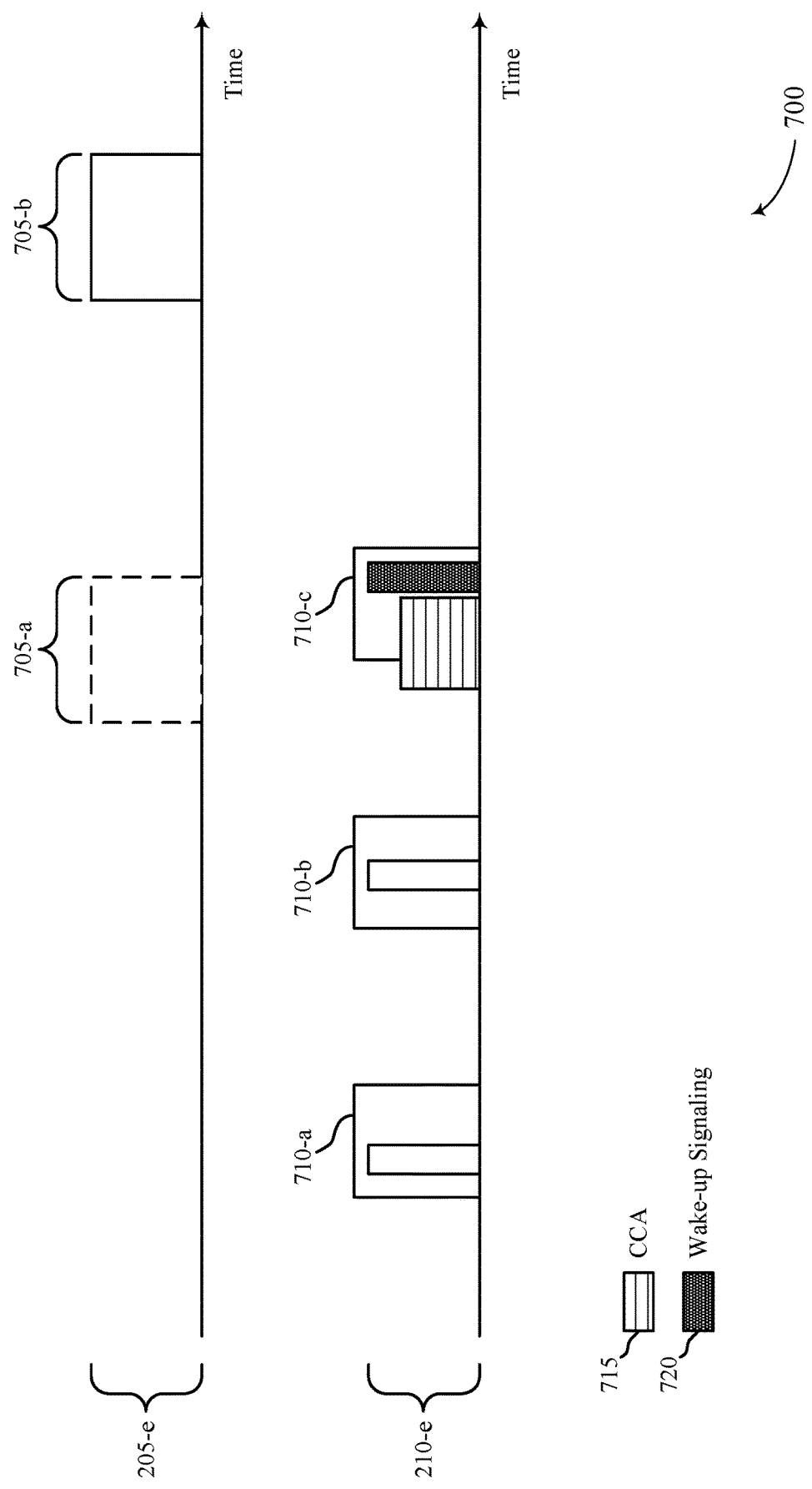
FIG. 7 illustrates example techniques for monitoring a low-band carrier in a shared radio frequency spectrum for wake-up signaling based on a DRX cycle in accordance with aspects of the present disclosure.

FIG. 7 illustrates example techniques for monitoring a low-band carrier 210-*e* in a shared radio frequency spectrum for wake-up signaling based on a C-DRX cycle in accordance with aspects of the present disclosure. UE 115-*a* may communicate with base station 105-*a* in an active mode on high-band carrier 205-*e* before transitioning to a DRX mode on high-band carrier 205-*e*. After transitioning to the DRX mode on high-band carrier 205-*e*, UE 115-*a* may be scheduled to wake up periodically during on-durations 705 to communicate with base station 105-*a*. As described herein, however, UE 115-*a* may wake up during a scheduled on-duration 705 after receiving wake-up signaling on low-band carrier 210-*e* indicating the presence of data in the on-duration 705. For instance, UE 115-*a* may wake up during a scheduled on-duration 705-*b* after receiving wake-up signaling 720 on low-band carrier (e.g., in a monitoring occasion 710-*c*).

In the example of FIG. 7, UE 115-*a* may be configured to monitor low-band carrier 210-*e* for wake-up signaling based on a C-DRX cycle. In particular, UE 115-*a* may be scheduled to monitor low-band carrier 210-*e* for wake-up signaling during on-durations 705 based on the C-DRX cycle. Since low-band carrier 210-*e* may be located in a shared radio frequency spectrum, base station 105-*a* may have to gain access to low-band carrier 210-*e* prior to transmitting wake-up signaling. However, the duration of a CCA procedure 715 used to gain access to low-band carrier 210-*e* may vary, and, as a result, the location of wake-up signaling 720 on low-band carrier 210-*e* may also vary.

As described herein, UE 115-*a* may be configured to monitor a longer time window for wake-up signaling in a shared radio frequency spectrum (i.e., UE 115-*a* may be configured with a longer on-duration) than a time window monitored for wake-up signaling in an unshared radio frequency spectrum (e.g., since wake-up signal locations may be fixed in an unshared radio frequency spectrum). Further, since the location of the wake-up signaling may be variable, base station 105-*a* may specify, via control signaling transmitted along with the wake-up signaling, a timing interval between the wake-up signaling in the low-band carrier 210-*e* and reference signals transmitted in high-band carrier 205-*e*. As such, UE 115-*a* may receive the indication of the timing interval, and UE 115-*a* may be able to identify the location of reference signals to use for beam measurements (e.g., as part of a beam management procedure). If base station 105-*a* misses a wake-up signaling opportunity due to CCA failure, base station 105-*a* may initiate an early CCA procedure to gain access to low-band carrier 210-*e* for a subsequent wake-up signaling opportunity.

Figure 8:
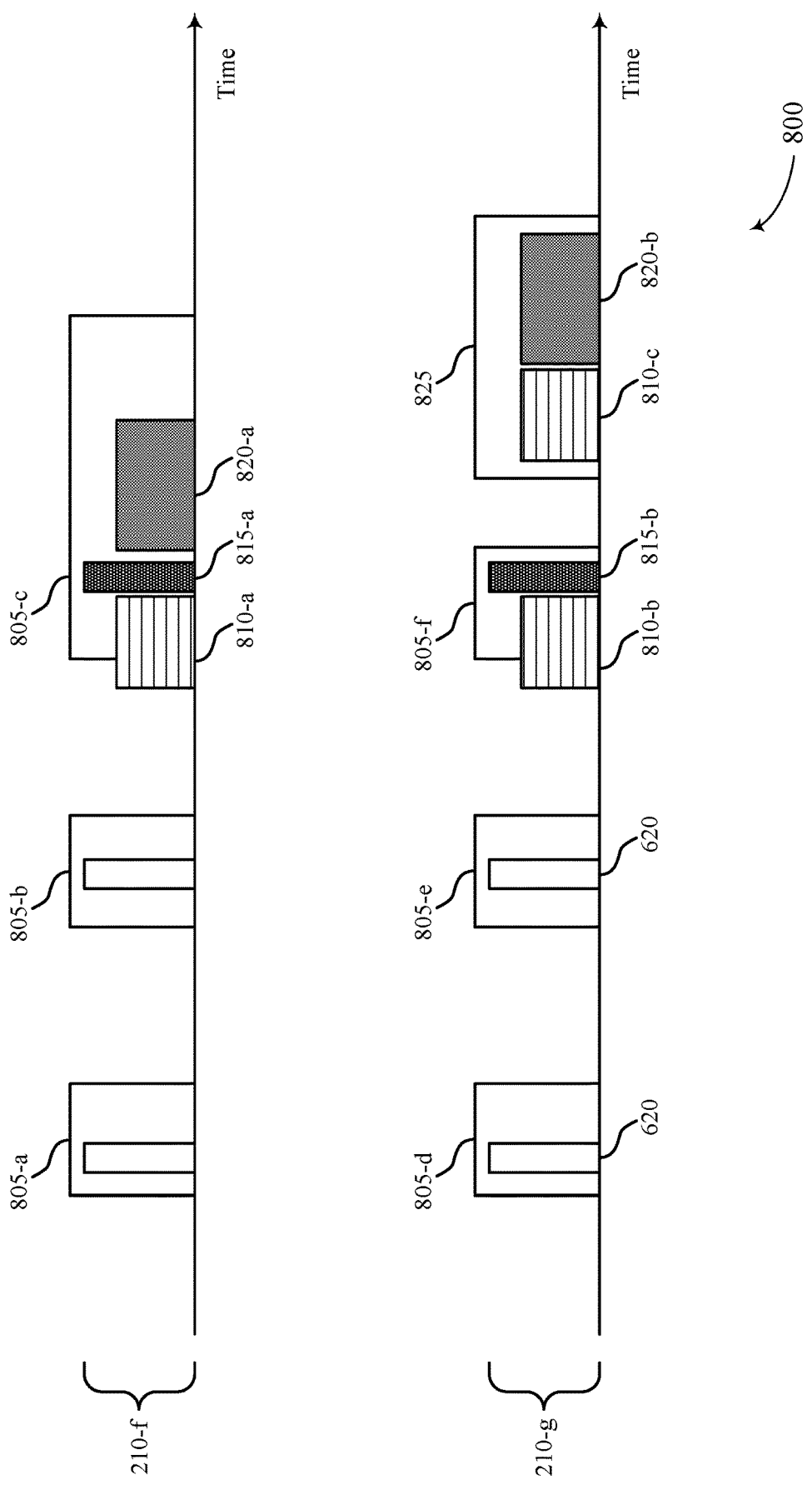
FIG. 8 illustrates example techniques for transmitting control information on a low-band carrier in accordance with aspects of the present disclosure.

In addition to transmitting wake-up signaling on a low-band carrier, base station 105-*a* may transmit a PDCCH on the low-band carrier. The PDCCH may include scheduling information for a data transmission to UE 115-*a* in a PDSCH on a high-band carrier, an indication of reference signal beam occasions on a high-band carrier, etc. FIG. 8 illustrates example techniques for transmitting a PDCCH on a low-band carrier in accordance with aspects of the present disclosure.

In one example of FIG. 8, UE 115-*a* may monitor low-band carrier 210-*f* for wake-up signaling during on-durations 805 based on a C-DRX cycle. UE 115-*a* may fail to receive wake-up signaling during on-durations 805-*a* and 805-*b*. Thus, UE 115-*a* may avoid waking up during corresponding on-durations on a high-band carrier for data on the high-band carrier. UE 115-*a* may then receive wake-up signaling 815-*a* during on-duration 805-*c* (e.g., wake-up signaling transmitted by base station 105-*a* after a CCA procedure 810-*a*), and, based on receiving the wake-up signaling 815-*a*, UE 115-*a* may extend on-duration 805-*c* to receive a PDCCH 820-*a* during on-duration 805-*c*. That is, base station 105-*a* may transmit wake-up signaling 815-*a* and control information in a PDCCH 820-*a* in a single transmission opportunity (i.e., after performing a single CCA procedure 810-*a* and without giving up the shared radio frequency spectrum between the wake-up signaling 815-*a* and PDCCH 820-*a*). In some cases, base station 105-*a* may pre-configure PDCCH monitoring occasions via RRC signaling or base station 105-*a* may include a layer 1 indication in a wake-up signaling message to indicate a PDCCH monitoring occasion.

In another example of FIG. 8, UE 115-*a* may monitor low-band carrier 210-*g* for wake-up signaling during on-durations 805 based on a C-DRX cycle. UE 115-*a* may fail to receive wake-up signaling during on-durations 805-*d* and 805-*e*. Thus, UE 115-*a* may avoid waking up during corresponding on-durations on a high-band carrier for data on the high-band carrier. UE 115-*a* may then receive wake-up signaling 815-*b* during on-duration 805-*c* (e.g., wake-up signaling transmitted by base station 105-*a* after a CCA procedure 810-*b*), and, based on receiving the wake-up signaling 815-*b*, UE 115-*a* may determine to wake up during a subsequent monitoring occasion 825 (e.g., a PDCCH monitoring occasion) to receive a PDCCH 820-*b* (e.g., after transitioning to a sleep mode after receiving the wake-up signaling). That is, base station 105-*a* may transmit wake-up signaling 815-*b* in one transmission opportunity (e.g., after performing a first CCA procedure 810-*b* to capture the shared radio frequency spectrum), and base station 105-*a* may transmit a PDCCH 820-*b* in another transmission opportunity (e.g., after performing a second CCA procedure 810-*c* to recapture the shared radio frequency spectrum). As such, the base station 105-*a* may transmit wake-up signaling 815-*b* and PDCCH 820-*b* in different transmission opportunities, and thus may perform separate CCA procedures 810-*b* and 810-*c* to capture and recapture the shared radio frequency spectrum. In some cases, base station 105-*a* may indicate a location of a PDCCH monitoring occasion via a wake-up signaling message. Further, some information about a search space for UE 115-*a* to monitor for PDCCH 820-*b* may be pre-configured (e.g., time-frequency resources offset from an initial time).

Figure 9:
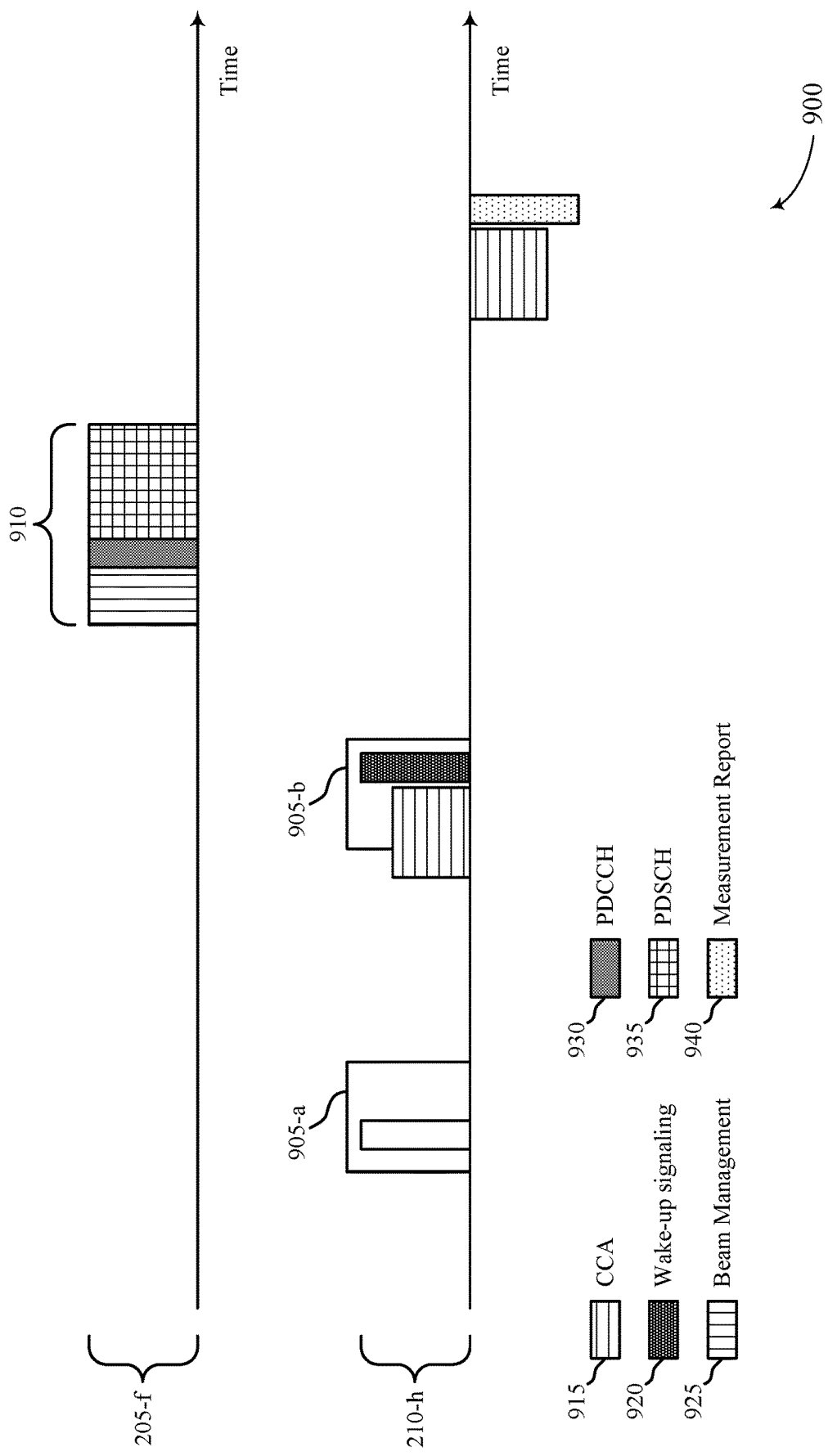
FIG. 9 illustrates an example of resources used by a UE to transmit a measurement report on a low-band carrier in a shared radio frequency spectrum in accordance with aspects of the present disclosure.

FIG. 9 illustrates an example of resources 900 used by a UE 115-*a* to transmit a measurement report 940 on a low-band carrier 210-*h* in a shared radio frequency spectrum in accordance with aspects of the present disclosure. In the example of FIG. 9, UE 115-*a* may receive wake-up signaling 920 in a monitoring occasion 905-*b* for a data transmission in on-duration 910 (e.g., where base station 105-*a* may perform CCA 915 prior to transmitting the wake-up signaling 920). UE 115-*a* may then perform a beam management procedure 925 (e.g., UE 115-*a* may perform beam measurements based on reference signals received from base station 105-*a*, as discussed above). In some cases, UE 115-*a* may determine to transmit a measurement report 940 for the beam management procedure 925 on low-band carrier 210-*h*. Since low-band carrier 210-*h* may be in a shared radio frequency spectrum, the transmission of the measurement report 940 may be delayed (e.g., the interval between the beam management procedure 925 and the measurement report 940 may be variable). As such, UE 115-*a* may receive PDCCH 930 and PDSCH 935 from base station 105-*a* on a previously configured beam. UE 115-*a* may then perform CCA 915, and, if UE 115-*a* is able to gain access to low-band carrier 210-*h*, UE 115-*a* may transmit the measurement report 940. In some examples, UE 115-*a* may be configured to use scheduled uplink or autonomous uplink resources to transmit the measurement report 940 (e.g., if the UE 115-*a* is unable to gain access to low-band carrier 210-*h*).

In some aspects, UE 115-*a* may wake up for the on-duration (or extended on-duration) 910 and may fail to detect reference signals on high-band carrier 205-*f* or may fail to detect a beam having reasonable quality (e.g., associated with an SINR that is above a certain threshold) based on reference signals received on high band carrier 205-*f*. Alternatively, UE 115-*a* may wake up for the on-duration 910 and may fail to detect control information in PDCCH 930 or data in PDSCH 935. In such cases, a beam failure event may be triggered. Such a beam failure event may occur when UE 115-*a* is no longer in a coverage area of a mmW cell due to mobility, orientation change, or other factors. After the beam failure event is triggered, UE 115-*a* may initiate a beam recovery procedure.

As part of the beam recovery procedure, UE 115-*a* may transmit an indication (e.g., on high-band carrier 205-*c* or low-band carrier 210-*c*) to base station 105-*a* that UE 115-*a* failed to identify a candidate beam for communications with base station 105-*a* or that UE 115-*a* failed to receive control information in PDCCH 930 or data in PDSCH 935. The indication may be referred to as a failure detection signal. In some cases, if UE 115-*a* is configured to transmit the failure detection signal on a carrier in a shared radio frequency spectrum, the UE 115-*a* may have to gain access to a channel to transmit the failure detection signal (i.e., the failure detection signal may be gated by CCA). In such cases, UE 115-*a* may be configured to use scheduled uplink or autonomous uplink resources to transmit the failure detection signal. UE 115-*a* may then communicate with base station 105-*a* to attempt to re-establish a connection on high-band carrier 205-*c* to receive the data intended for UE 115-*a*.

In some cases, the transmission of the wake-up signaling may be further delayed due to the numerology of the high-band carrier being different from the numerology of the low-band carrier. Because the numerologies of the high-band carrier and the low-band carrier may be different, the sleep state durations in the C-DRX cycles on both carriers may be different. Thus, the C-DRX cycle on the high-band carrier 205 may not be synchronized with the C-DRX cycle on the low-band carrier 210 (e.g., the time between on-durations in the two C-DRX cycles may be inconsistent). As a result, when base station 105-*a* identifies data to transmit to UE 115-*a* prior to an on-duration on the high-band carrier 205, and no on-duration is scheduled on the low-band carrier 210 prior to the on-duration on the high-band carrier 205, base station 105-*a* may have to delay the transmission of the data until a next on-duration on the high-band carrier.

Figure 10:
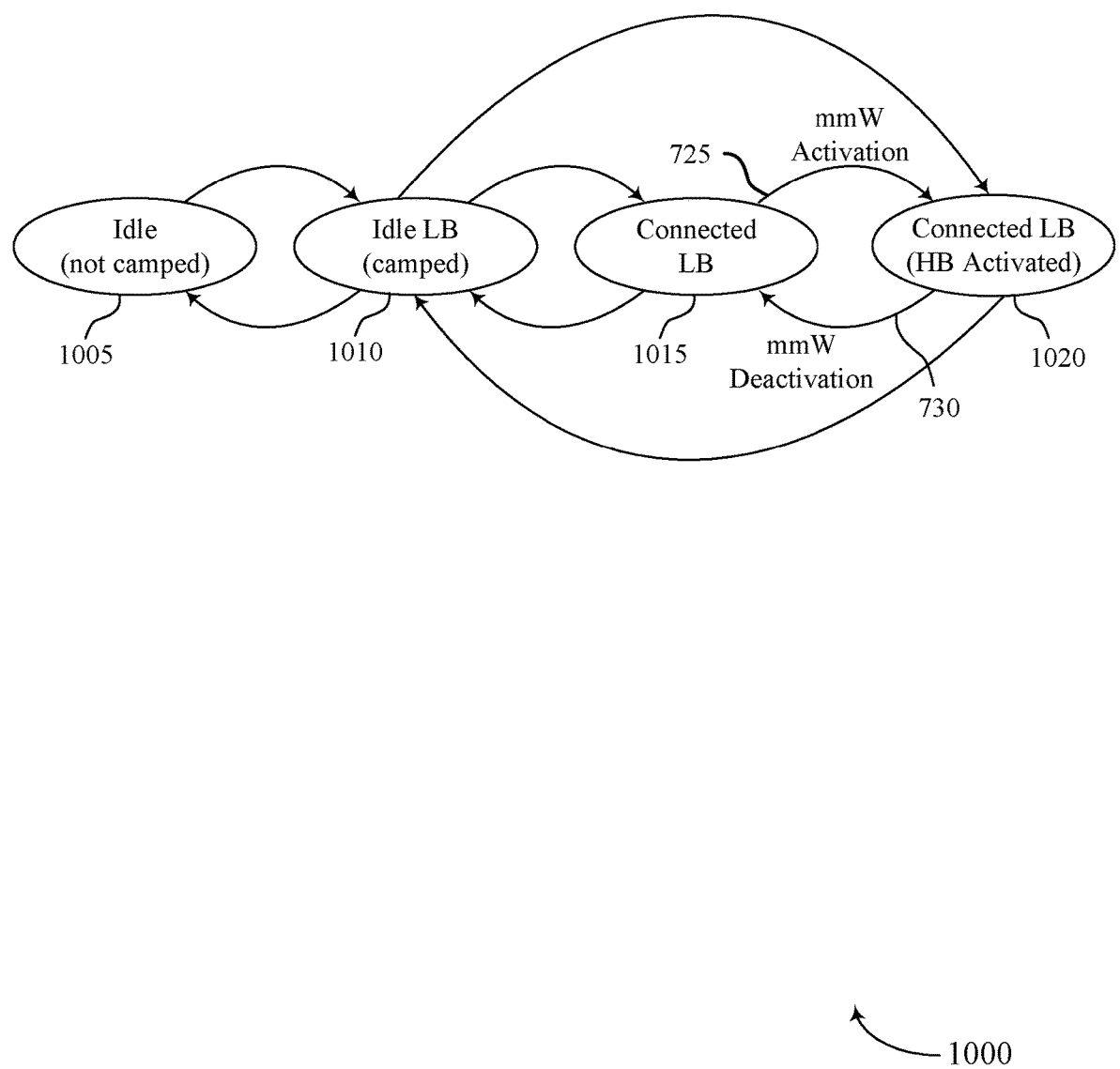
FIGS. 10 and 11 illustrate examples of state diagrams in accordance with aspects of the present disclosure.

FIG. 10 illustrates an example of a state diagram 1000 that supports techniques for low-band anchored high-band connections in wireless communications in accordance with aspects of the present disclosure. In some examples, state diagram 1000 may illustrate states that may be implemented at UEs 115 of wireless communications system 100 or 200. In the example of FIG. 10, a UE may initially be in an idle (not camped) state 1005, in which the UE has not established a connection with a base station. The UE may, upon establishing a connection with a base station in a low-band, move to an idle low-band (camped) state 1010, in which the UE is camped on a low-band carrier. The UE may transition to a connected low-band state 1015 when data is to be transmitted between the UE and the base station on the low band carrier. Such a transmission may be signaled, for example, by RRC signaling from the base station. In some cases, when the UE is in the connected low-band state 1015, the base station may pre-configure the UE with a number of high-bands that may be monitored and used for a high-band connection.

In the example of FIG. 10, the UE may transition to a connected low-band (high-band activated) state 1020. In some cases, the base station may transmit a high-band or mmW activation command 1025 to the UE, and the UE enters the connected low-band (high-band activated) state 1020 responsive to the activation command 1025. In some cases, the UE may perform one or more measurements or evaluations to determine whether a high-band connection can be established, and if so, whether high-band uplink data and/or control transmissions are supported. The UE may exit the connected low-band (high-band activated) state 1020 responsive to a high-band or mmW deactivation command 1030. In some cases, the UE may enter and exit the connected low-band (high-band activated) state 1020 from the idle low-band camped state 1010 responsive to a paging message received from the low-band base station.

Thus, in such cases, the UE may camp on a low-band, and high-band or mmW communications may be opportunistically activated and deactivated based on current data traffic conditions and conditions at the UE. In some cases, the low-band base station may transmit a mmW activation command 1025 upon determining that, for example, data traffic at the UE would benefit from a mmW connection. As indicated above, the base station may pre-configure the UE with a set of high-bands. Once the UE receives the mmW activation command 1025, the UE may attempt to find and join one of the pre-configured mmW cells. In some cases, different levels of levels of pre-configuration may be provided. For example, such pre-configuration information may include a list of cells and channels that are available for mmW connections, and the UE may measure the configured channels for reference signals from the configured cells. In other cases, the pre-configuration information may include information for the UE to connect to any given cell in any of a number of sub-states that may be selected based on a currently supported mode for high-band communications at the UE, an example of which is discussed with respect to FIG. 11.

Figure 11:
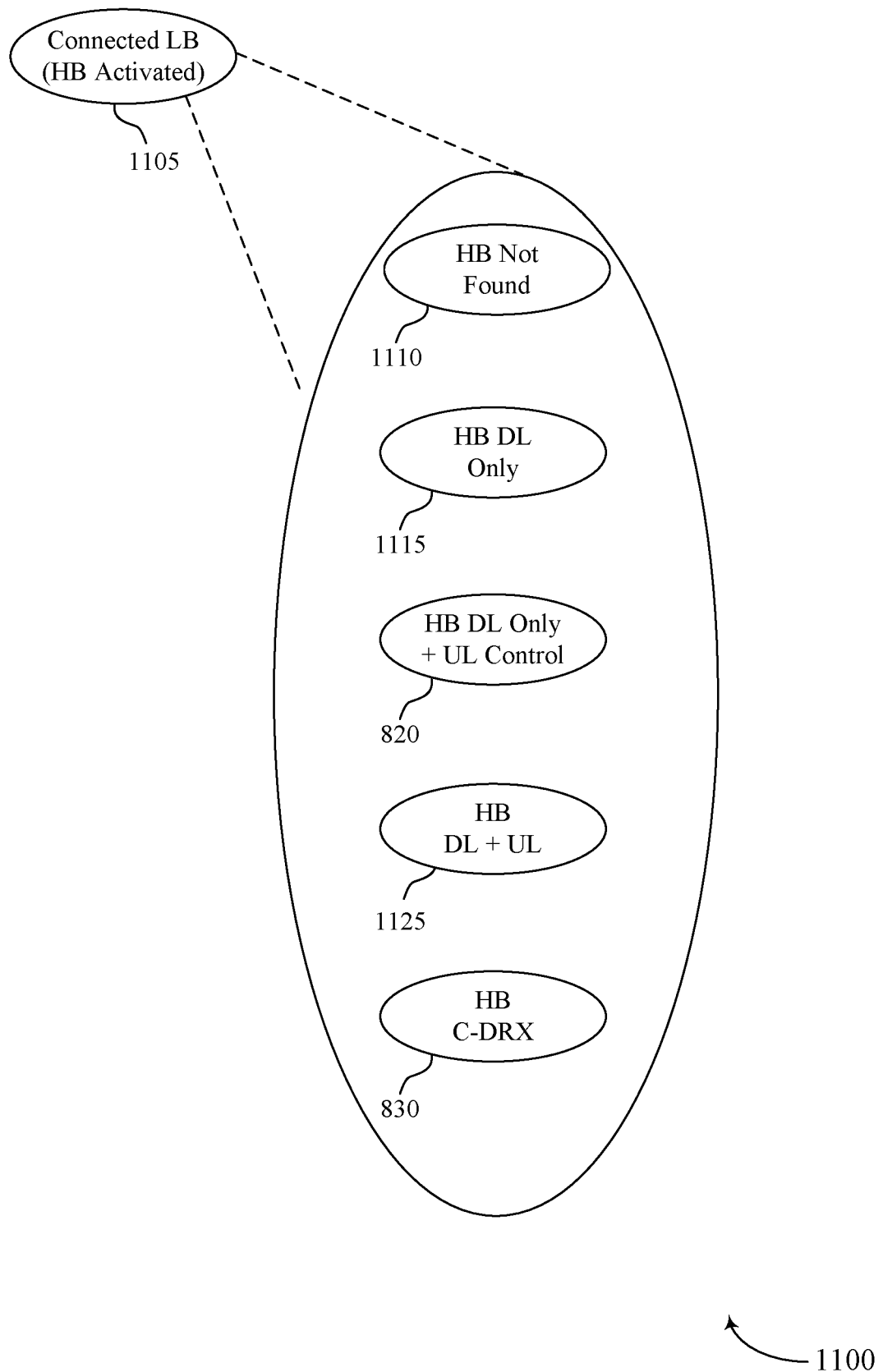

FIG. 11 illustrates an example of a state diagram 1100 that supports techniques for low-band anchored high-band connections in wireless communications in accordance with aspects of the present disclosure. In some examples, state diagram 1100 may illustrate states that may be implemented at UEs 115 of wireless communications system 100 or 200. In the example of FIG. 11, a UE may be in a connected low-band (high-band activated) state 1105. As discussed above, the UE may enter such a state upon receipt of an activation command while in a connected low-band or idle low-band (camped) state, as discussed above with respect to FIG. 10.

In some cases, upon receiving the activation command, the UE may monitor for reference signals on a high-band (e.g., discovery reference signal (DRS), channel state information reference signal (CSI-RS), UE-specific reference signal (UE-RS), etc.) and measure received reference signals (e.g., perform a reference signal received power (RSRP) measurement, or other measurement) to select a high-band carrier for an attempt to activate the high-band connection. In some cases, additionally or alternatively, the UE may determine one or more UE parameters that may impact a high-band connection, such as a link budget for uplink transmissions, whether maximum permissible exposure (MPE) at the UE is at or near a threshold MPE value, a UE battery state, a context of the UE, one or more applications running at the UE, or any combination thereof. Based on the measured reference signals and the current UE parameters, the UE may determine one of a number of sub-states that correspond to a currently supported mode for an activated high-band connection.

In the example of FIG. 11, the UE may enter a high-band not found state 1110, if the UE is not able to detect any high-band reference signals having a channel quality that is sufficient to support a high-band connection (e.g., measured RSRP values from high-band transmitters are below a threshold value). In some cases, the high-band not found state 1110 may be a result of occlusion/shadowing of a high-band antenna at the UE and may be a transient condition. Thus, in some cases, a UE may periodically perform the measurements and/or determinations of the one or more UE parameters. UE may transition from any sub-state to any other sub-state based on the one or more measurements and/or determinations of the UE parameters.

In some cases, the UE may enter a high-band downlink only state 1115. Such a state may be entered if, for example, the UE does not have sufficient link budget for high-band uplink transmissions, does not have sufficient battery power to support high-band uplink transmissions, is at an MPE threshold, or any combination thereof. Additionally, or alternatively, the UE context/applications may indicate to the UE that high-band uplink transmissions are not needed. In such cases, the UE may operate in a high-band downlink reception mode as the currently supported mode for the activated high-band connection.

In other cases, the UE may enter a high-band downlink only plus uplink control state 1120. Such a state may be entered if, for example, the UE does have some link budget for a limited number of high-band uplink transmissions, has sufficient battery power to support a limited number of high-band uplink transmissions, is approaching an MPE threshold, or any combination thereof. Additionally, or alternatively, the UE context/applications may indicate to the UE that any data that is to be transmitted may be sufficiently handled by the low-band connection, and thus that high-band uplink data transmissions are not needed but high-band uplink control transmissions may be transmitted. In some cases, high-band uplink control transmissions may be preferable to low-band control transmissions (e.g., if low-band transmissions use shared spectrum it may be more reliable to transmit control using high-band transmissions). In such cases, the UE may operate in a high-band downlink only plus uplink control mode as the currently supported mode for the activated high-band connection.

In the example of FIG. 11, the UE may also enter a high-band downlink plus uplink state 1125. Such a state may be entered if, for example, the UE has sufficient link budget for high-band uplink data transmissions, has sufficient battery power to support high-band uplink data transmissions, is below an MPE threshold, or any combination thereof. Additionally, or alternatively, the UE context/applications may indicate to the UE that significant amounts of data are likely to be transmitted that may not be sufficiently served by the low-band connection. In some cases, high-band uplink data (and/or control) transmissions may be preferable to low-band transmissions (e.g., if low-band transmissions use shared spectrum it may be more reliable to transmit using high-band transmissions). In such cases, the UE may operate in a high-band downlink plus uplink mode as the currently supported mode for the activated high-band connection.

In some cases, the UE may also enter a high-band C-DRX state 1130. Such a state may be entered if, for example, the UE has limited battery power to support monitoring a high-band carrier or if significant amounts of bursty data is likely to be transmitted. Additionally, or alternatively, the UE context/applications may indicate to the UE that significant amounts of data are likely to be transmitted that may not be sufficiently served by the low-band connection. In some cases, high-band uplink data (and/or control) transmissions may be preferable to low-band transmissions (e.g., if low-band transmissions use shared spectrum it may be more reliable to transmit using high-band transmissions).

As indicated, in some cases, transition between UE high-band states 1110-1130 may happen dynamically while in the connected low-band (high-band activated) state 1105, and such a state transition may be signaled on either a high-band carrier or a low-band carrier. In some cases, uplink resources may be provided for uplink transmissions associated with high-band activation. In some cases, such uplink resources may allow for efficient usage overhead and provide timelines for relatively fast signaling of high-band states or high-band state transitions. Further, in some cases, uplink resources configured on high-band connections may be preferred in cases where channel access on a low-band shared spectrum may have unbounded delays due to contention-based access procedures (e.g., LBT procedures). In some cases, a base station may reserve uplink resources on both the low-band and high-band connections that may be used to allow the UE to signal its high-band state. In some cases, the uplink resource may include RACH resources, which may be contention-free RACH resources and/or RACH resources that are provisioned to distinguish UE IDs and UE-states. In some cases, the uplink resources may include, additionally or alternatively to the RACH resources, physical uplink control channel (PUCCH) resources, autonomous UL resources, or combinations thereof.

In some cases, upon receiving an activation command to activate a high-band connection, a UE may determine a preferred high-band carrier and the currently supported mode for the activated high-band connection. In cases where high-band connections may be used for uplink signaling, the UE may transmit a first message (Msg #1), which may be transmitted on a preferred high-band carrier to a base station using a preferred transmission beam. The first message may include the state of the UE for the high-band connection. The UE may then receive a second message (Msg #2), which may include an acknowledgment from the base station. In some cases, the second message may also include an RRC reconfiguration command to reconfigure the high-band connection. The UE may then, in some cases, transmit a third message (Msg #3), which may be an RRC reconfiguration complete message, following which data transmissions may be transmitted using the high-band connection, based on high-band provisioned resources for the UE that correspond to the communicated state of the UE.

In some cases, uplink resources may be configured on the low-band connection. In some cases, low-band resources may be provided for signaling following the high-band activation message. In some cases, the low-band resources may be periodically configured to allow a UE to transmit when a high-band connection is not available or usable by the UE. In such cases, following the determination of the preferred high-band base station and the currently supported mode for the activated high-band connection, the UE may transmit a first message (Msg #1), which may indicate, for example, a preferred high-band carrier, a preferred high-band beam identification, a UE high-band state (e.g., high-band downlink only, high-band fail, etc.). The UE may then receive a second message (Msg #2), which may include an acknowledgment on the low-band carrier. In some cases, the second message may also include an RRC reconfiguration command to reconfigure the high-band connection. The UE may then, in some cases, transmit a third message (Msg #3), which may be an RRC reconfiguration complete message, following which data transmissions may be transmitted using the high-band connection, the low-band connection, or combinations thereof (e.g., high-band downlink transmissions and low-band uplink transmissions), based on provisioned resources for the UE that correspond to the communicated state of the UE.

Figure 12:
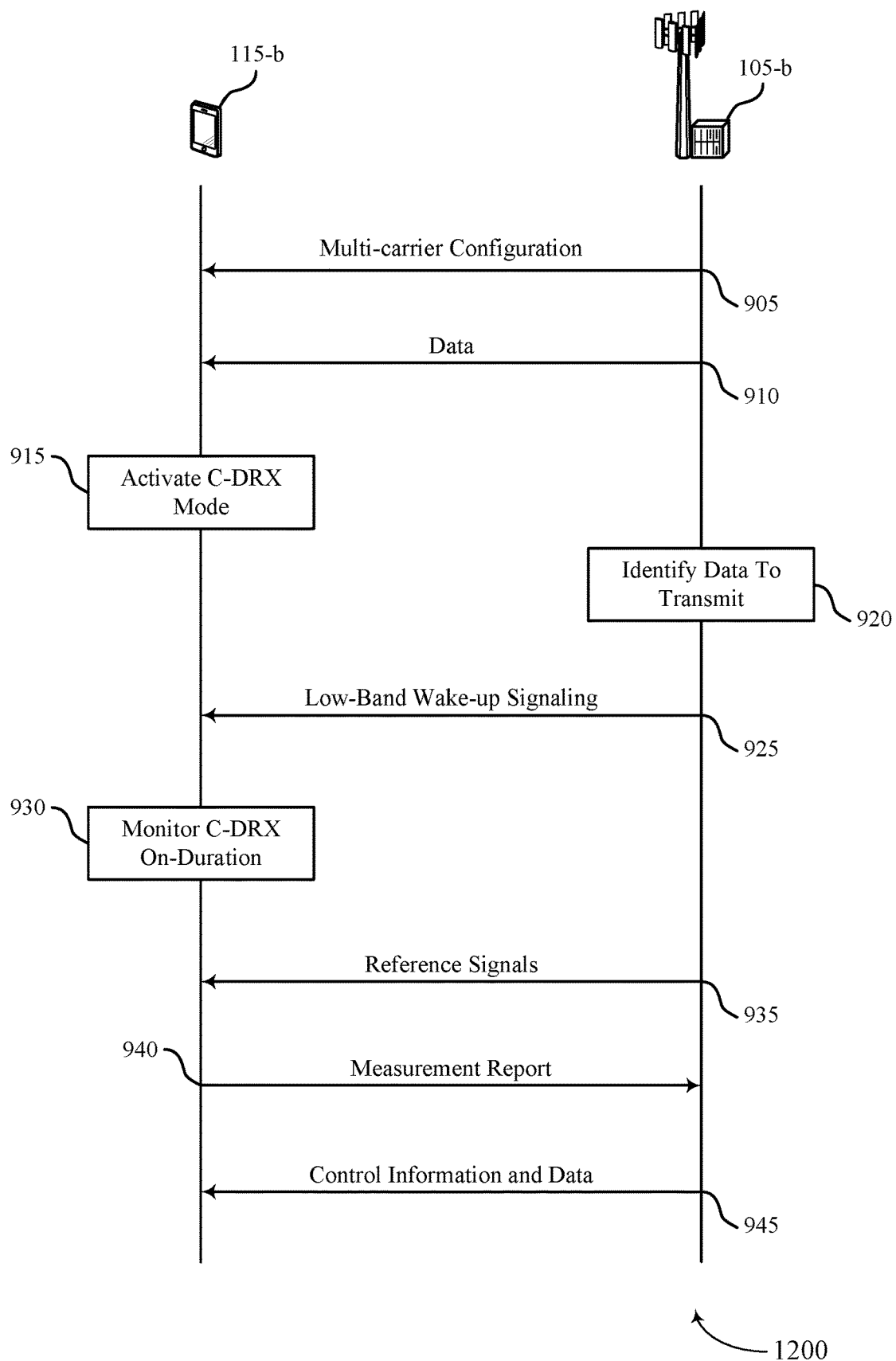
FIG. 12 illustrates an example of a process flow in accordance with aspects of the present disclosure.

FIG. 12 illustrates an example of a process flow 1200 in accordance with aspects of the present disclosure. Process flow 1200 illustrates aspects of techniques performed by a base station 105-*b*, which may be an example of a base station described with reference to FIGS. 1-11. Process flow 1200 also illustrates aspects of techniques performed by a UE 115-*b*, which may be an example of a UE described with reference to FIGS. 1-11. Although the techniques described below with reference to FIG. 12 discuss a downlink transmission, it is to be understood that the same techniques may be applied for uplink transmissions.

At 1205, base station 105-*b* may configure a first carrier and a second carrier for communications with UE 115-*a*. In some cases, the first carrier may be a high-band carrier and the second carrier may be a low-band carrier. UE 115-*a* may be configured to monitor the low-band carrier as an anchor carrier in an active mode. In some cases, base station 105-*b* may identify data to transmit to UE 115-*b* on the high-band carrier, and base station 105-*b* may transmit an activate command to UE 115-*b* for UE 115-*b* to establish a connection with base station 105-*b* on the high-band carrier and monitor the high-band carrier for the data from the base station 105-*b*. At 1210, base station 105-*b* may transmit the data to UE 115-*b*.

After a certain period of inactivity after the data transmission at 1210, at 1215, UE 115-*b* may activate a C-DRX mode on the high-band carrier. As described herein, the UE 115-*b* may be configured to wake up during an on-duration of the C-DRX mode after receiving wake-up signaling on the low-band carrier prior to the on-duration. Thus, after activating the C-DRX mode at 1215, UE 115-*b* may avoid waking for on-durations if no wake-up signaling is received on the low-band carrier. Alternatively, base station 105-*b* may transmit signaling for each scheduled on-duration of the C-DRX cycle without data to indicate the absence of data in the scheduled on-duration.

At 1220, base station 105-*b* may identify data to transmit to UE 115-*b* in an on-duration of the C-DRX cycle. As such, at 1225, base station 105-*b* may transmit wake-up signaling on a low-band carrier to UE 115-*b* prior to the on-duration. UE 115-*b* may receive the wake-up signaling, and, at 1230, UE 115-*b* may wake up during the on-duration to monitor for data from base station 105-*b*. In some cases, before receiving the data from base station 105-*b* on the high-band carrier, it may be appropriate for UE 115-*b* to perform a beam management procedure to identify an appropriate beam for base station 105-*b* to use to transmit the data on the high-band carrier and for UE 115-*b* to use to receive the data on the high-band carrier.

As such, at 1235, base station 105-*b* may transmit reference signals to UE 115-*b* on the high-band carrier for UE 115-*b* to use to identify a candidate beam for communications with base station 105-*b*. UE 115-*b* may receive the reference signals on the high-band carrier and, in some cases, may identify a candidate beam for communicating with base station 105-*b* based on the reference signals. At 1240, UE 115-*b* may then transmit an indication of the candidate beam in a beam measurement report on the high-band carrier or the low-band carrier to base station 105-*b*. In other cases, UE 115-*b* may fail to identify a candidate beam for communicating with base station 105-*b*, and UE 115-*b* may transmit an indication of the failure to identify the candidate beam to base station 105-*b*. The reference signals used to attempt to identify the candidate beam may be cell-specific reference signals or UE-specific reference signals.

Once base station 105-*b* and UE 115-*b* identifies the candidate beam for communications in an on-duration, at 1245, base station 105-*b* may transmit control information (e.g., in a PDCCH or in another channel) using the candidate beam to UE 115-*b* to schedule a data transmission in the on-duration on the high-band carrier. Base station 105-*b* may then transmit the data to UE 115-*b* on the high-band carrier using the candidate beam, and UE 115-*b* may receive the data on the high-band carrier using the candidate beam. In some cases, after receiving the data on the high-band carrier, UE 115-*b* may fail to receive wake-up signaling on the high-band carrier for a predefined duration. In such cases, an inactivity monitored by UE 115-*b* may expire, and UE 115-*b* may deactivate the C-DRX cycle on the high-band carrier.

Figure 13:
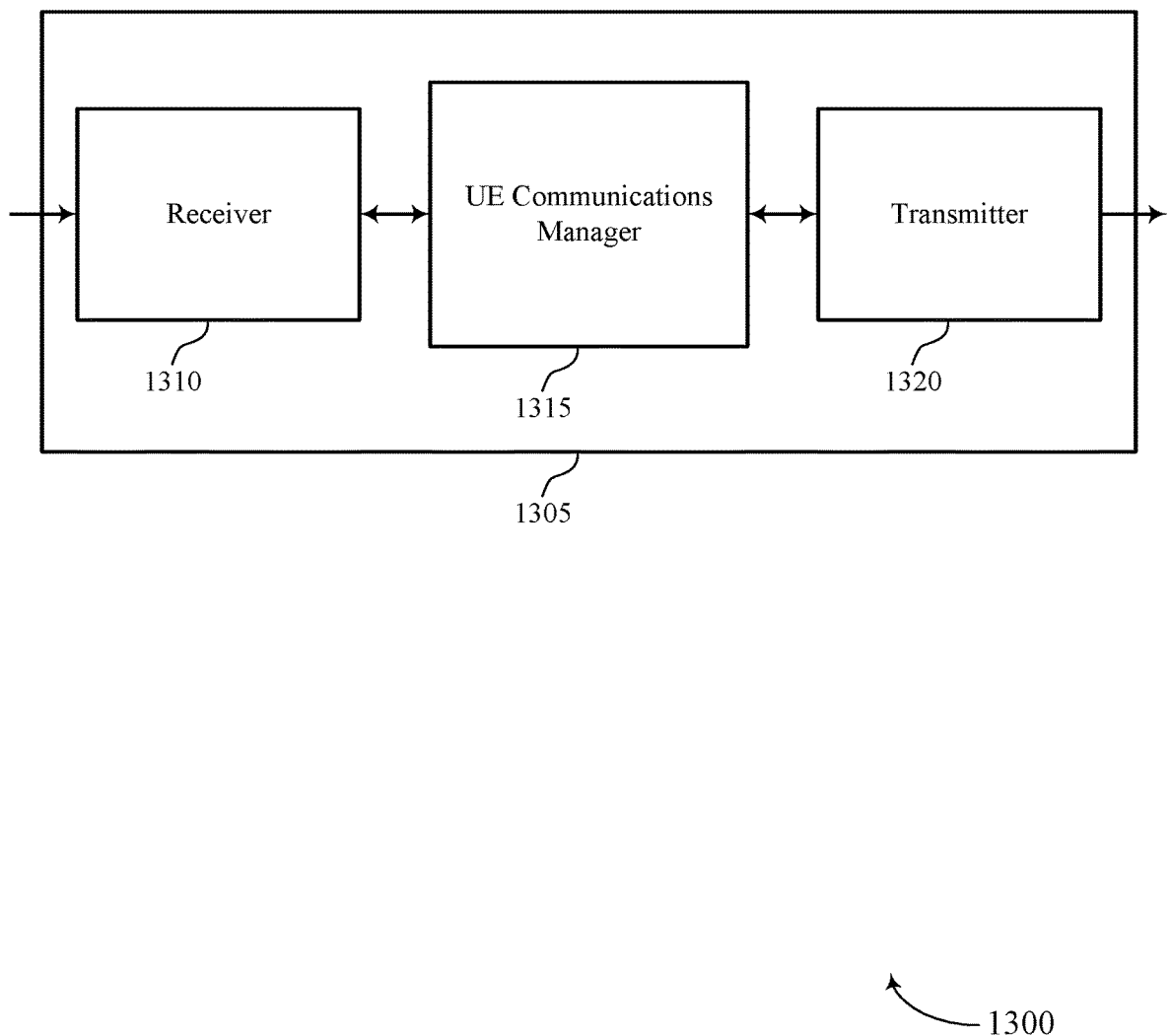
FIGS. 13-15 show block diagrams of a device that supports dual band DRX in accordance with aspects of the present disclosure.

FIG. 13 shows a block diagram 1300 of a wireless device 1305 in accordance with aspects of the present disclosure. Wireless device 1305 may be an example of aspects of a UE 115 as described herein. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels and data channels). Information may be passed on to other components of the device. The receiver 1310 may be an example of aspects of the transceiver 1635 described with reference to FIG. 16. The receiver 1310 may utilize a single antenna or a set of antennas.

UE communications manager 1315 may be an example of aspects of the UE communications manager 1615 described with reference to FIG. 16. UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 1315 and/or at least some of its various sub-components may be physically located at various positions, including being distributed such that portions of functions are implemented at different physical locations by one or more physical devices. In some examples, UE communications manager 1315 and/or at least some of its various sub-components may be a separate and distinct component in accordance with aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

UE communications manager 1315 may monitor a first carrier for wake-up signaling from a base station, the wake-up signaling being for a DRX cycle on a second carrier, receive wake-up signaling on the first carrier prior to an on-duration in the DRX cycle, the wake-up signaling indicating a presence of data on the second carrier in the on-duration, and wake up for the on-duration to receive the data on the second carrier based on receiving the wake-up signaling.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
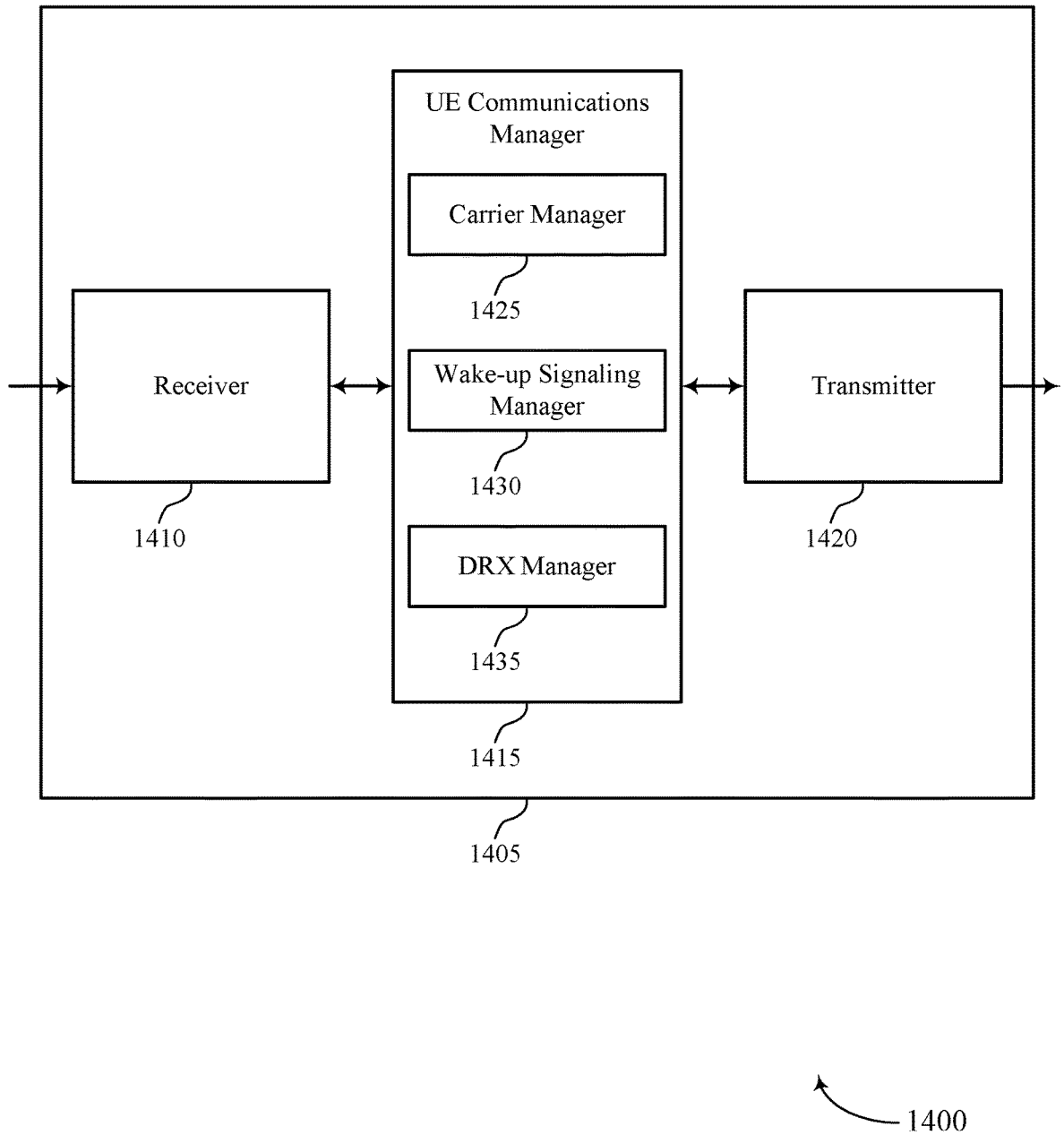

FIG. 14 shows a block diagram 1400 of a wireless device 1405 in accordance with aspects of the present disclosure. Wireless device 1405 may be an example of aspects of a wireless device 1305 or a UE 115 as described with reference to FIG. 13. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels and data channels). Information may be passed on to other components of the device. The receiver 1410 may be an example of aspects of the transceiver 1635 described with reference to FIG. 16. The receiver 1410 may utilize a single antenna or a set of antennas.

UE communications manager 1415 may be an example of aspects of the UE communications manager 1615 described with reference to FIG. 16. UE communications manager 1415 may include carrier manager 1425, wake-up signaling manager 1430, and DRX manager 1435.

Carrier manager 1425 may monitor a first carrier for wake-up signaling from a base station, the wake-up signaling being for a DRX cycle on a second carrier. Wake-up signaling manager 1430 may receive wake-up signaling on the first carrier prior to an on-duration in the DRX cycle, the wake-up signaling indicating a presence of data on the second carrier in the on-duration. DRX manager 1435 may then wake up for the on-duration to receive the data on the second carrier based on receiving the wake-up signaling.

In some cases, DRX manager 1435 may receive signaling indicating an absence of data in a subsequent on-duration, and DRX manager 1435 may avoid waking up for the subsequent on-duration based on receiving the signaling indicating the absence of data in the subsequent on-duration. In some cases, DRX manager 1435 may fail to receive wake-up signaling on the first carrier prior to a subsequent on-duration in the DRX cycle, and DRX manager 1435 may avoid waking up for the subsequent on-duration based on failing to receive the wake-up signaling.

In some cases, DRX manager 1435 may receive an indication from the base station to activate the DRX cycle on the second carrier, where the indication is received on the first carrier, and DRX manager 1435 may activate the DRX cycle on the second carrier based on receiving the indication. In some cases, DRX manager 1435 may fail to receive wake-up signaling on the first carrier for a predefined duration, determine that an inactivity timer associated with the DRX cycle has expired based on failing to receive the wake-up signaling on the first carrier for the predefined duration, and deactivate the DRX cycle on the second carrier based on the determination.

In some cases, the first carrier is monitored in an active mode or another DRX cycle is used on the first carrier. In some cases, the first carrier includes a low frequency band carrier and the second carrier includes a high frequency band carrier. In some cases, the first carrier or the second carrier includes an unshared radio frequency spectrum band or a shared radio frequency spectrum band. In some cases, the unshared radio frequency spectrum band includes a radio frequency spectrum band licensed to a single operator, and the shared radio frequency spectrum band includes a radio frequency spectrum band that is unlicensed, licensed to multiple operators, or licensed to a single operator with opportunistic access by other operators.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
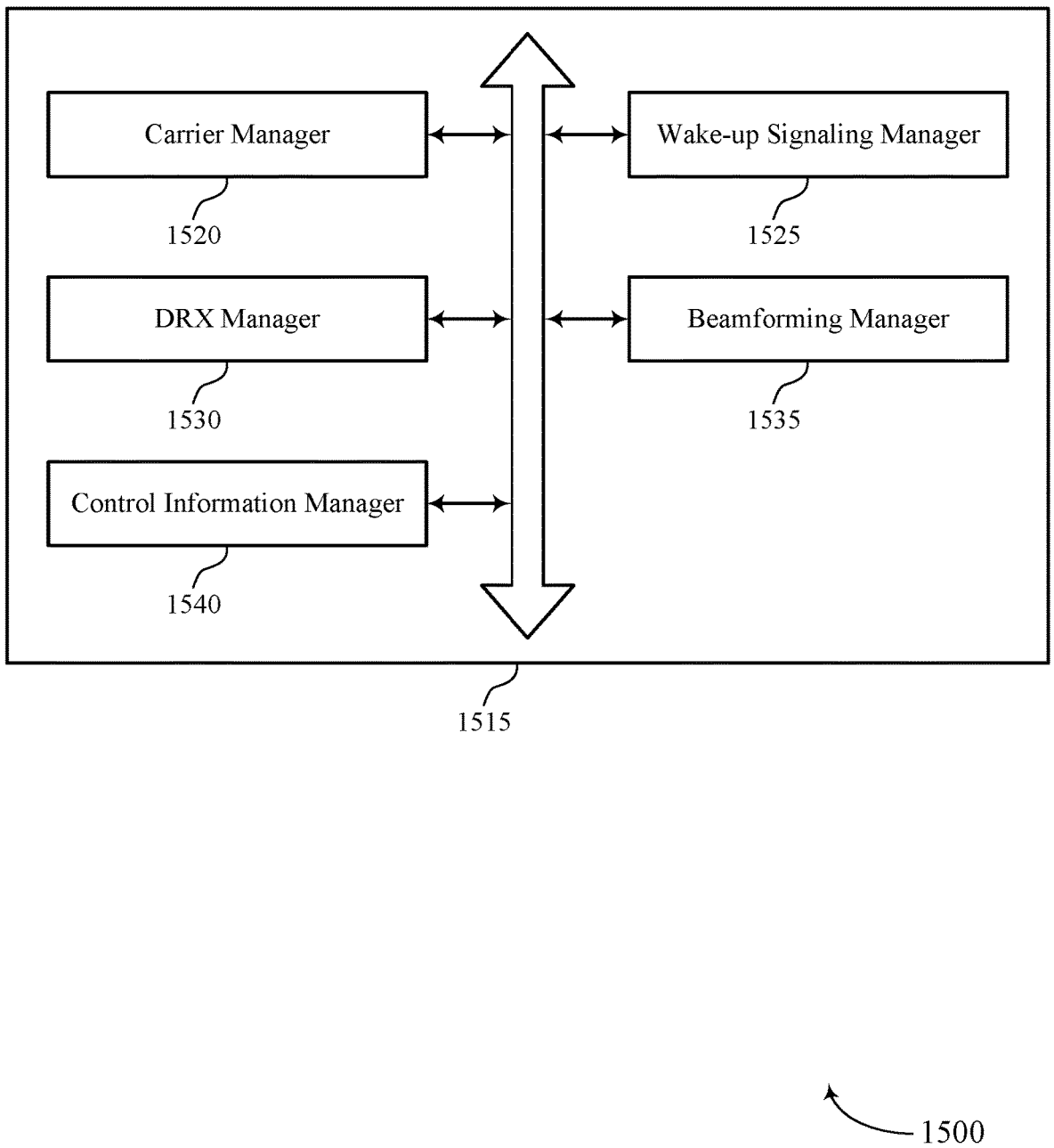

FIG. 15 shows a block diagram 1500 of a UE communications manager 1515 in accordance with aspects of the present disclosure. The UE communications manager 1515 may be an example of aspects of a UE communications manager 1315, a UE communications manager 1415, or a UE communications manager 1615 described with reference to FIGS. 13, 14, and 16. The UE communications manager 1515 may include carrier manager 1520, wake-up signaling manager 1525, DRX manager 1530, beamforming manager 1535, and control information manager 1540. Each of these modules may communicate, directly or indirectly, with one another (e.g., via one or more buses).

Carrier manager 1520 may monitor a first carrier for wake-up signaling from a base station, the wake-up signaling being for a DRX cycle on a second carrier. Wake-up signaling manager 1525 may receive wake-up signaling on the first carrier prior to an on-duration in the DRX cycle, the wake-up signaling indicating a presence of data on the second carrier in the on-duration. DRX manager 1530 may then wake up for the on-duration to receive the data on the second carrier based on receiving the wake-up signaling.

In some cases, the first carrier may be in a shared radio frequency spectrum band, and the wake-up signaling manager 1525 may monitor the first carrier for the wake-up signaling using another DRX cycle. In some cases, DRX manager 1530 may extend an on-duration of the other DRX cycle used to monitor the first carrier for the wake-up signaling based at least in part on the first carrier being in the shared radio frequency spectrum band, wherein the monitoring the first carrier for wake-up signaling using the other DRX cycle is based at least in part on the extended on-duration.

In some cases, control information manager 1540 may monitor the first carrier for control information after receiving the wake-up signaling. In some cases, DRX manager 1530 may extend an on-duration of the other DRX cycle to monitor the first carrier for the control information based at least in part on receiving the wake-up signaling, wherein monitoring the first carrier for the control information is based at least in part on the extended on-duration. In some cases, control information manager 1540 may receive an indication of one or more control information monitoring occasions, wherein the extending is based at least in part on the indicated one or more control information monitoring occasions.

In some cases, wake-up signaling manager 1525 may transition to a sleep mode after receiving the wake-up signaling, and control information manager 1540 may wake up to monitor the first carrier for the control information based at least in part on receiving the wake-up signaling. In some cases, control information manager 1540 may receive an indication of control information monitoring occasions, wherein the waking up is based at least in part on the indicated control information monitoring occasions. In some cases, control information manager 1540 may receive configuration information for a search space associated with the control information, wherein monitoring the first carrier for the control information is based at least in part on the search space.

In some cases, DRX manager 1530 may receive signaling indicating an absence of data in a subsequent on-duration, and DRX manager 1530 may avoid waking up for the subsequent on-duration based on receiving the signaling indicating the absence of data in the subsequent on-duration. In some cases, DRX manager 1530 may fail to receive wake-up signaling on the first carrier prior to a subsequent on-duration in the DRX cycle, and DRX manager 1530 may avoid waking up for the subsequent on-duration based on failing to receive the wake-up signaling.

In some cases, DRX manager 1530 may receive an indication from the base station to activate the DRX cycle on the second carrier, where the indication is received on the first carrier, and DRX manager 1530 may activate the DRX cycle on the second carrier based on receiving the indication. In some cases, DRX manager 1530 may fail to receive wake-up signaling on the first carrier for a predefined duration, determine that an inactivity timer associated with the DRX cycle has expired based on failing to receive the wake-up signaling on the first carrier for the predefined duration, and deactivate the DRX cycle on the second carrier based on the determination.

In some cases, beamforming manager 1535 may receive reference signals from the base station on the second carrier in the on-duration of the DRX cycle, identify a candidate beam for communications with the base station based on the received reference signals, transmit an indication of the candidate beam in a measurement report to the base station on uplink resources in the on-duration on the first carrier or the second carrier. In some cases, the first carrier is in a shared radio frequency spectrum band, and the beamforming manager 1535 may receive an indication of a duration between the wake-up signaling received on the first carrier and the reference signals received on the second carrier. In other cases, beamforming manager 1535 may receive reference signals from the base station on the second carrier in the on-duration of the DRX cycle, fail to identify a candidate beam for communications with the base station based on the received reference signals, and transmit an indication of the failure to identify the candidate beam to the base station on uplink resources in the on-duration on the first carrier or the second carrier. In some cases, the first carrier or the second carrier used to transmit the indication of the failure to identify the candidate beam is in a shared radio frequency spectrum. In such cases, beamforming manager 1535 may fail to gain access to a channel to transmit the indication of the failure to identify the candidate beam, and beamforming manager 1535 may transmit the indication of the failure to identify the candidate beam on scheduled or autonomous uplink resources. In some cases, the reference signals include cell-specific reference signals or UE-specific reference signals. In some cases, the on-duration includes an extended on-duration.

In some cases, control information manager 1540 may receive control information on the second carrier that schedules a transmission of the data from the base station on the second carrier in the on-duration. In other cases, control information manager 1540 may receive control information on the first carrier that schedules a transmission of the data from the base station on the second carrier in the on-duration. In some cases, the first carrier is monitored in an active mode or another DRX cycle is used on the first carrier. In some cases, the first carrier includes a low frequency band carrier and the second carrier includes a high frequency band carrier. In some cases, the first carrier or the second carrier includes an unshared radio frequency spectrum band or a shared radio frequency spectrum band. In some cases, the unshared radio frequency spectrum band includes a radio frequency spectrum band licensed to a single operator, and the shared radio frequency spectrum band includes a radio frequency spectrum band that is unlicensed, licensed to multiple operators, or licensed to a single operator with opportunistic access by other operators.

Figure 16:
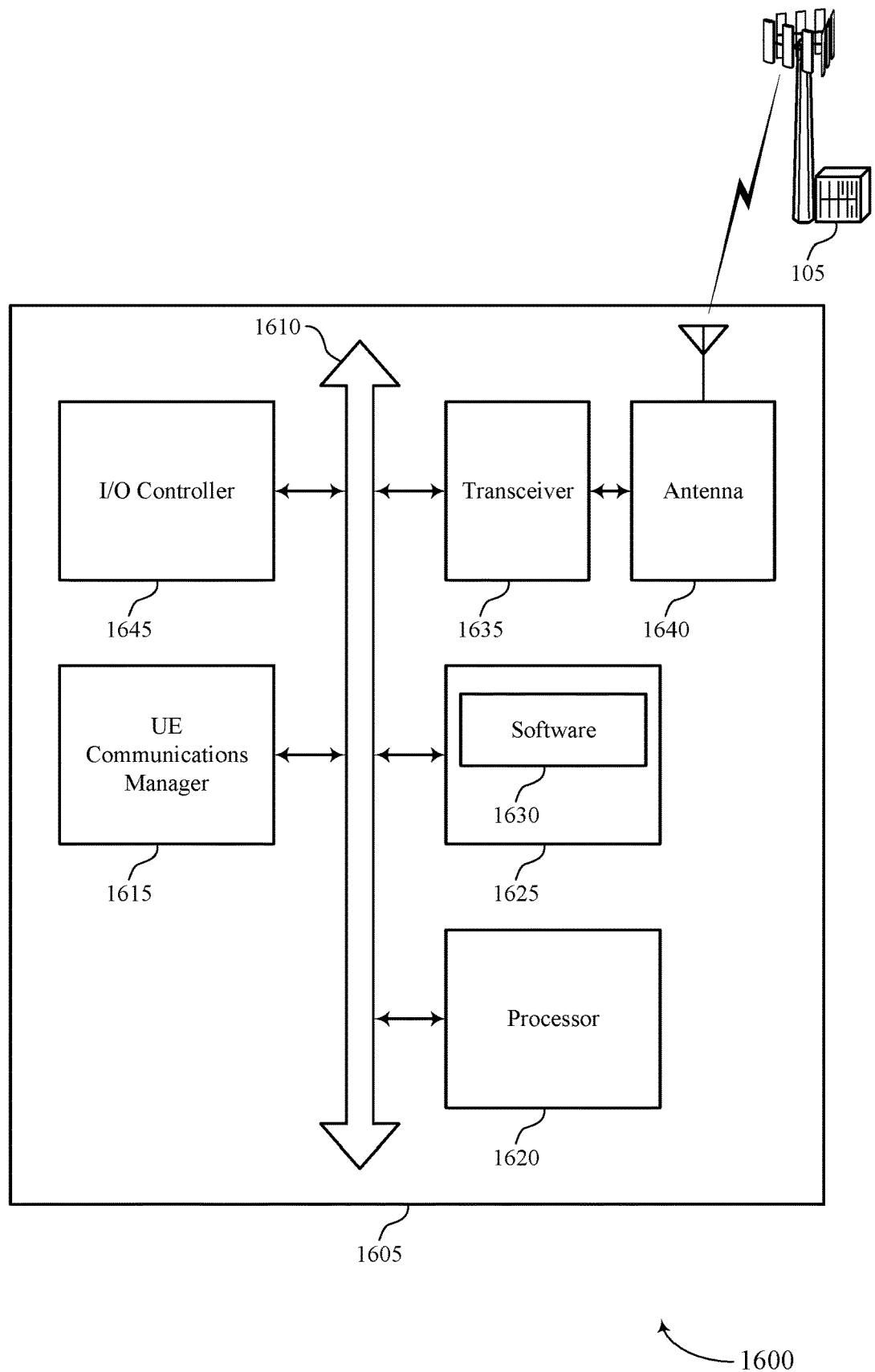
FIG. 16 illustrates a block diagram of a system including a UE that supports dual band DRX in accordance with aspects of the present disclosure.

FIG. 16 shows a diagram of a system 1600 including a device 1605 in accordance with aspects of the present disclosure. Device 1605 may be an example of or include the components of wireless device 1305, wireless device 1405, or a UE 115 as described above, e.g., with reference to FIGS. 13 and 14. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

Processor 1620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting dual band DRX).

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a basic input/output system (BIOS) which may control basic hardware or software operation such as the interaction with peripheral components or devices.

Software 1630 may include code to implement aspects of the present disclosure, including code to support dual band DRX. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
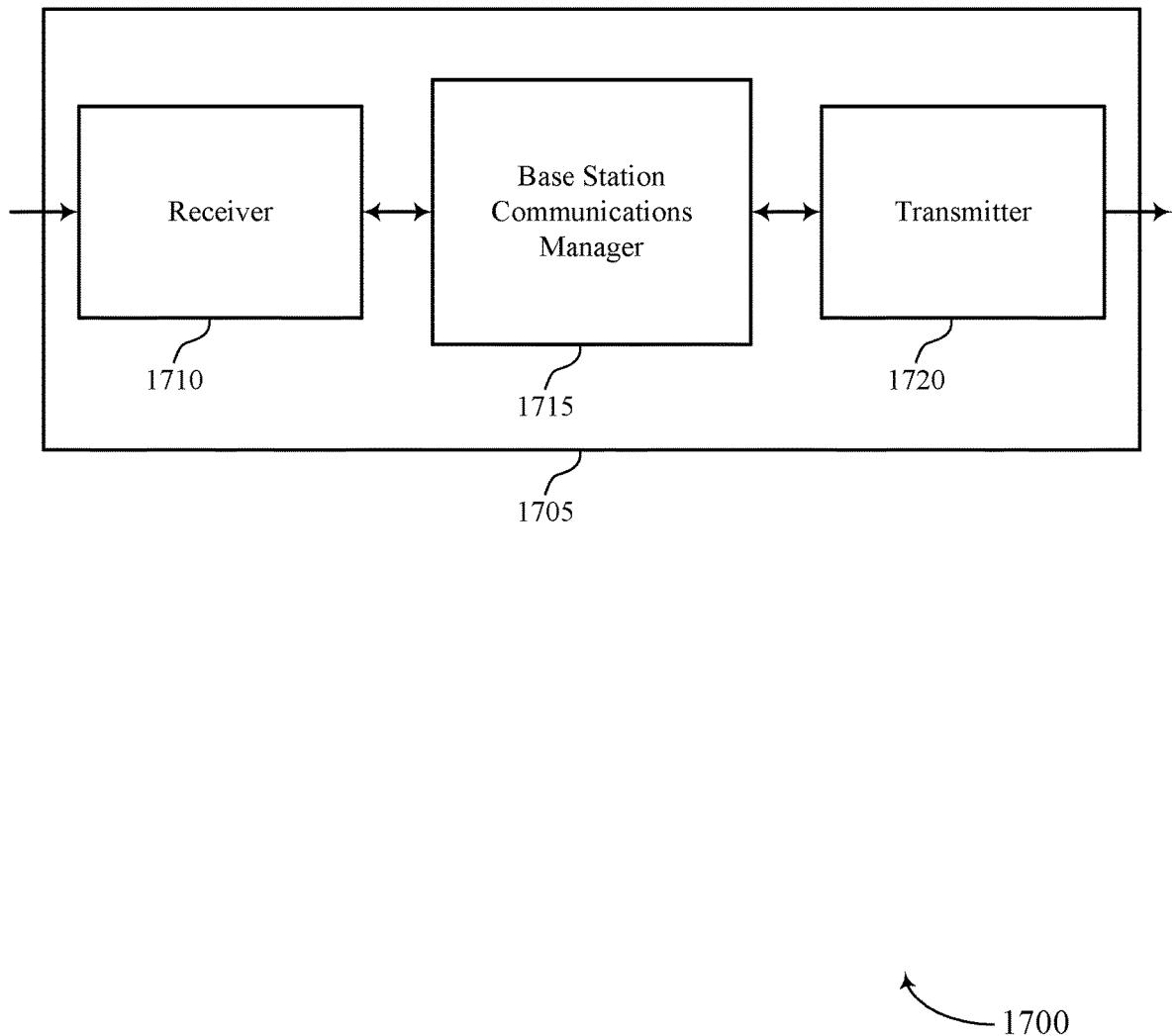
FIGS. 17-19 show block diagrams of a device that supports dual band DRX in accordance with aspects of the present disclosure.

FIG. 17 shows a block diagram 1700 of a wireless device 1705 in accordance with aspects of the present disclosure. Wireless device 1705 may be an example of aspects of a base station 105 as described herein. Wireless device 1705 may include receiver 1710, base station communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels and data channels). Information may be passed on to other components of the device. The receiver 1710 may be an example of aspects of the transceiver 2035 described with reference to FIG. 20. The receiver 1710 may utilize a single antenna or a set of antennas.

Base station communications manager 1715 may be an example of aspects of the base station communications manager 2015 described with reference to FIG. 20. Base station communications manager 1715 and/or at least some of its various sub-components may be implemented in hardware, software executed by a processor, firmware, or any combination thereof. If implemented in software executed by a processor, the functions of the base station communications manager 1715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1715 and/or at least some of its various sub-components may be physically located at various positions, including being distributed such that portions of functions are implemented at different physical locations by one or more physical devices. In some examples, base station communications manager 1715 and/or at least some of its various sub-components may be a separate and distinct component in accordance with aspects of the present disclosure. In other examples, base station communications manager 1715 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

Base station communications manager 1715 may configure a first carrier and a second carrier for communications with a UE, identify data to transmit to the UE on the second carrier, transmit wake-up signaling on the first carrier prior to an on-duration in a DRX cycle used by the UE on the second carrier, the wake-up signaling indicating a presence of the data on the second carrier in the on-duration, and transmit the data to the UE on the second carrier in the on-duration based on transmitting the wake-up signaling.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may utilize a single antenna or a set of antennas.

Figure 18:
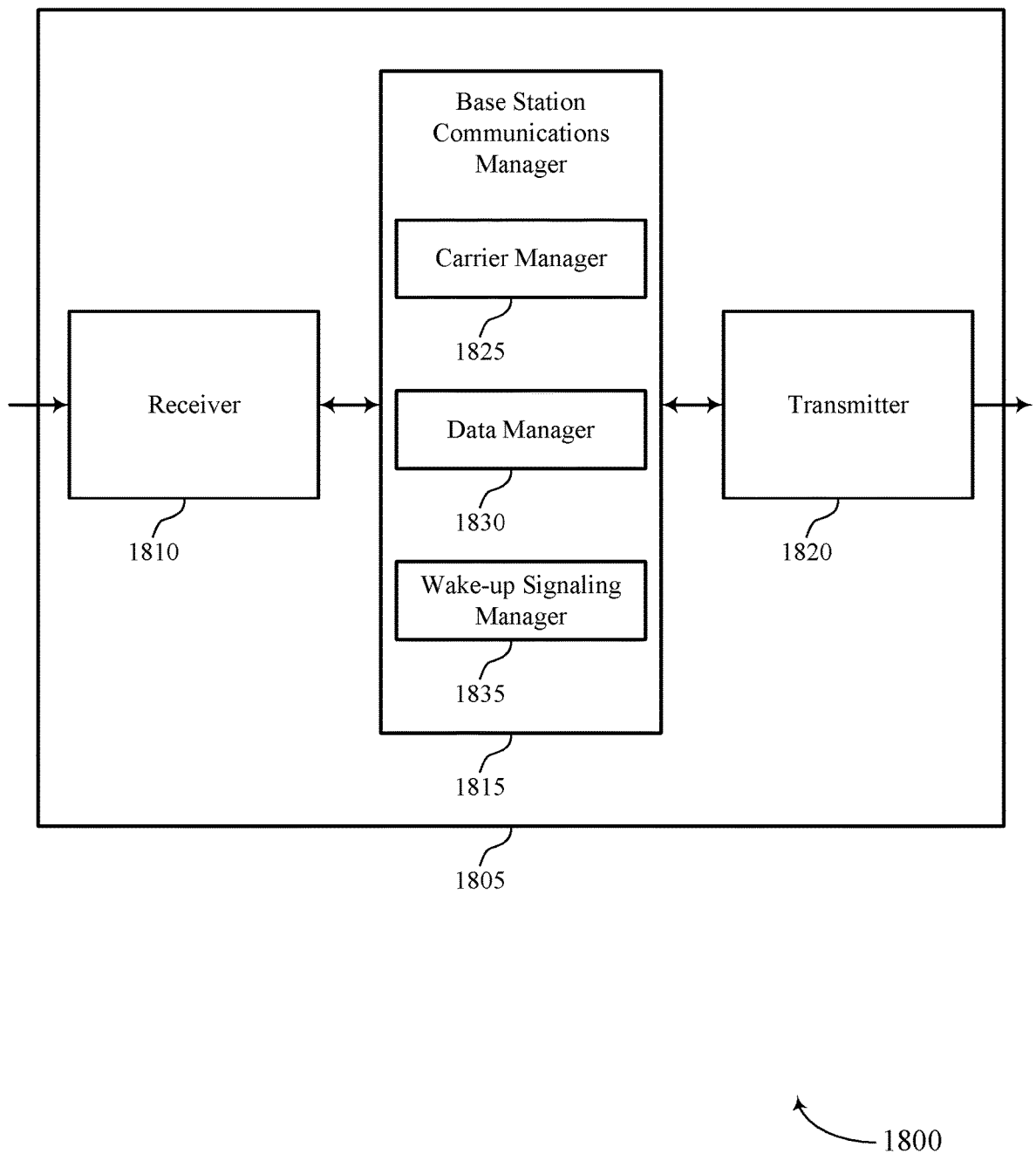

FIG. 18 shows a block diagram 1800 of a wireless device 1805 in accordance with aspects of the present disclosure. Wireless device 1805 may be an example of aspects of a wireless device 1705 or a base station 105 as described with reference to FIG. 17. Wireless device 1805 may include receiver 1810, base station communications manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels and data channels). Information may be passed on to other components of the device. The receiver 1810 may be an example of aspects of the transceiver 2035 described with reference to FIG. 20. The receiver 1810 may utilize a single antenna or a set of antennas.

Base station communications manager 1815 may be an example of aspects of the base station communications manager 2015 described with reference to FIG. 20. Base station communications manager 1815 may include carrier manager 1825, data manager 1830, and wake-up signaling manager 1835.

Carrier manager 1825 may configure a first carrier and a second carrier for communications with a UE. Data manager 1830 may identify data to transmit to the UE on the second carrier. Wake-up signaling manager 1835 may transmit wake-up signaling on the first carrier prior to an on-duration in a DRX cycle used by the UE on the second carrier, the wake-up signaling indicating a presence of the data on the second carrier in the on-duration. Data manager 1830 may then transmit the data to the UE on the second carrier in the on-duration based at least in part on transmitting the wake-up signaling.

In some cases, the first carrier is monitored by the UE in an active mode or another DRX cycle is used on the first carrier. In some cases, the first carrier includes a low frequency band carrier and the second carrier includes a high frequency band carrier. In some cases, the first carrier or the second carrier includes an unshared radio frequency spectrum band or a shared radio frequency spectrum band. In some cases, the unshared radio frequency spectrum band includes a radio frequency spectrum band licensed to a single operator, and the shared radio frequency spectrum band includes a radio frequency spectrum band that is unlicensed, licensed to multiple operators, or licensed to a single operator with opportunistic access by other operators.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may utilize a single antenna or a set of antennas.

Figure 19:
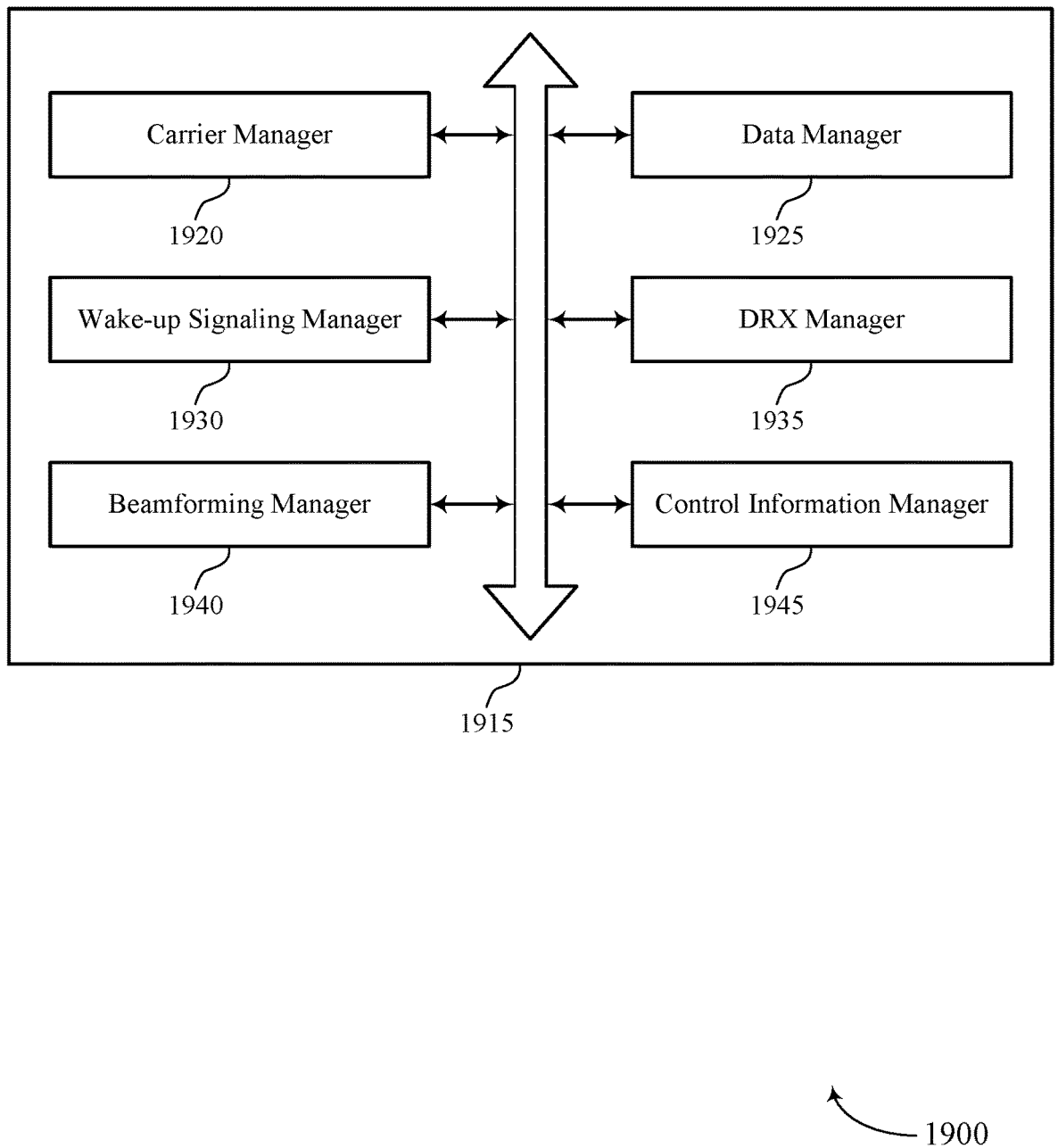

FIG. 19 shows a block diagram 1900 of a base station communications manager 1915 in accordance with aspects of the present disclosure. The base station communications manager 1915 may be an example of aspects of a base station communications manager 1715, a base station communications manager 1815, or a base station communications manager 2015 described with reference to FIGS. 17, 18, and 20. The base station communications manager 1915 may include carrier manager 1920, data manager 1925, wake-up signaling manager 1930, DRX manager 1935, beamforming manager 1940, and control information manager 1945. Each of these modules may communicate, directly or indirectly, with one another (e.g., via one or more buses).

Carrier manager 1920 may configure a first carrier and a second carrier for communications with a UE. Data manager 1925 may identify data to transmit to the UE on the second carrier. Wake-up signaling manager 1930 may transmit wake-up signaling on the first carrier prior to an on-duration in a DRX cycle used by the UE on the second carrier, the wake-up signaling indicating a presence of the data on the second carrier in the on-duration. Data manager 1925 may then transmit the data to the UE on the second carrier in the on-duration based on transmitting the wake-up signaling.

In some cases, the first carrier is in a shared radio frequency spectrum band, and the wake-up signaling manager 1930 may perform a CCA procedure to gain access to a channel on the first carrier for a transmission opportunity for transmitting the wake-up signaling, wherein transmitting the wake-up signaling occurs in the transmission opportunity. In some cases, wake-up signaling manager 1930 may successfully gain access to the channel on the first carrier based at least in part on performing the CCA procedure, and wake-up signaling manager 1930 may transmit the wake-up signaling in the channel on the first carrier. In some cases, wake-up signaling manager 1930 may fail to gain access to the channel on the first carrier, perform an early CCA procedure to gain access to the channel on the first carrier for a subsequent transmission opportunity for transmitting the wake-up signaling, successfully gain access to the channel on the first carrier based at least in part on performing the early CCA procedure, and transmit the wake-up signaling in the channel on the first carrier.

In some cases, control information manager 1945 may transmit control information on the first carrier after transmitting the wake-up signaling. In some cases, control information manager 1945 may transmit the control information in the transmission opportunity used for transmitting the wake-up signaling. In some cases, control information manager 1945 may perform another CCA procedure to gain access to the channel on the first carrier for another transmission opportunity for transmitting the control information, and control information manager 1945 may transmit the control information in the other transmission opportunity for transmitting the control information. In some cases, control information manager 1945 may transmit an indication of control information monitoring occasions to the UE. In some cases, control information manager 1945 may transmit configuration information for a search space associated with the control information, where the control information is transmitted on the first carrier in the search space.

DRX manager 1935 may transmit signaling indicating an absence of data in a subsequent on-duration. In some cases, DRX manager 1935 may transmit an indication to the UE to activate the DRX cycle on the second carrier, where the DRX cycle is activated by the UE based on the indication. In some cases, beamforming manager 1940 may transmit reference signals on the second carrier in the on-duration of the DRX cycle and receive an indication of a candidate beam selected by the UE for communications with the base station based on the reference signals, where the indication is received in a measurement report on uplink resources in the on-duration on the first carrier or the second carrier. In some cases, the first carrier is in a shared radio frequency spectrum band, and the beamforming manager 1940 may transmit an indication of a duration between the wake-up signaling transmitted on the first carrier and the reference signals transmitted on the second carrier. In other cases, beamforming manager 1940 may transmit reference signals on the second carrier in the on-duration of the DRX cycle and receive an indication that the UE failed to identify a candidate beam for communications with the base station based on the reference signals, where the indication is received on uplink resources in the on-duration on the first carrier or the second carrier. In some cases, the reference signals include cell-specific reference signals or UE-specific reference signals. In some cases, the on-duration includes an extended on-duration.

In some cases, control information manager 1945 may transmit control information on the second carrier that schedules a transmission of the data to the UE on the second carrier in the on-duration. In other cases, control information manager 1945 may transmit control information on the first carrier that schedules a transmission of the data to the UE on the second carrier in the on-duration. In some cases, the first carrier is monitored by the UE in an active mode or another DRX cycle is used on the first carrier. In some cases, the first carrier includes a low frequency band carrier and the second carrier includes a high frequency band carrier. In some cases, the first carrier or the second carrier includes an unshared radio frequency spectrum band or a shared radio frequency spectrum band. In some cases, the unshared radio frequency spectrum band includes a radio frequency spectrum band licensed to a single operator, and the shared radio frequency spectrum band includes a radio frequency spectrum band that is unlicensed, licensed to multiple operators, or licensed to a single operator with opportunistic access by other operators.

Figure 20:
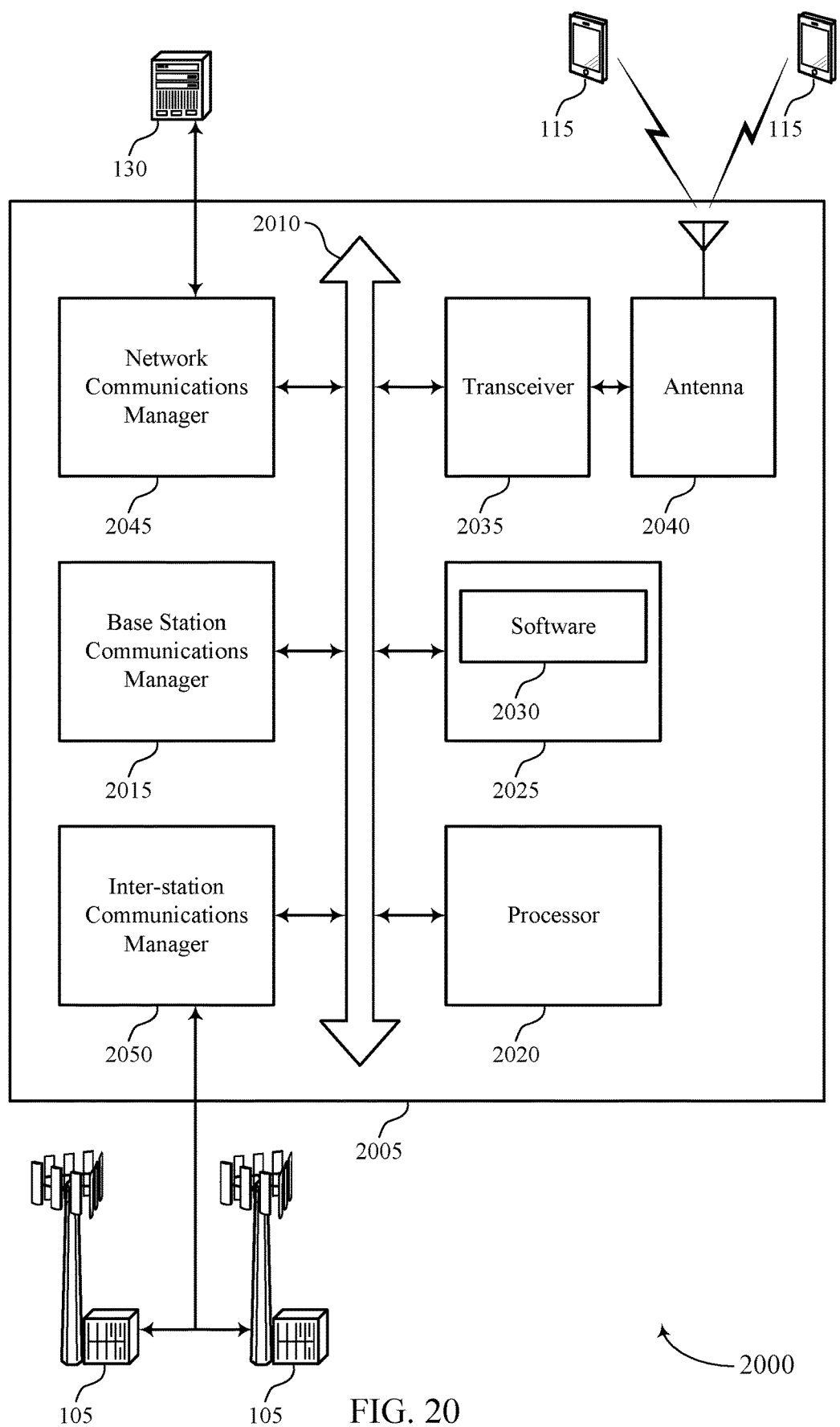
FIG. 20 illustrates a block diagram of a system including a base station that supports dual band DRX in accordance with aspects of the present disclosure.

FIG. 20 shows a diagram of a system 2000 including a device 2005 in accordance with aspects of the present disclosure. Device 2005 may be an example of or include the components of base station 105 as described above, e.g., with reference to FIG. 1. Device 2005 may include components for bi-directional voice and data communications including components for transmitting and receiving communications, including base station communications manager 2015, processor 2020, memory 2025, software 2030, transceiver 2035, antenna 2040, network communications manager 2045, and inter-station communications manager 2050. These components may be in electronic communication via one or more buses (e.g., bus 2010). Device 2005 may communicate wirelessly with one or more UEs 115.

Processor 2020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting dual band DRX).

Memory 2025 may include RAM and ROM. The memory 2025 may store computer-readable, computer-executable software 2030 including instructions that, when executed, cause the processor to perform various functions described herein. In some cases, the memory 2025 may contain, among other things, a BIOS which may control basic hardware or software operation such as the interaction with peripheral components or devices.

Software 2030 may include code to implement aspects of the present disclosure, including code to support dual band DRX. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

Network communications manager 2045 may manage communications with the core network (e.g., via one or more wired backhaul links). For example, the network communications manager 2045 may manage the transfer of data communications for client devices, such as one or more UEs 115.

Inter-station communications manager 2050 may manage communications with other base station 105, and may include a controller or scheduler for controlling communications with UEs 115 in cooperation with other base stations 105. For example, the inter-station communications manager 2050 may coordinate scheduling for transmissions to UEs 115 for various interference mitigation techniques such as beamforming or joint transmission. In some examples, inter-station communications manager 2050 may provide an X2 interface within an Long Term Evolution (LTE)/LTE-A wireless communication network technology to provide communication between base stations 105.

Figure 21:
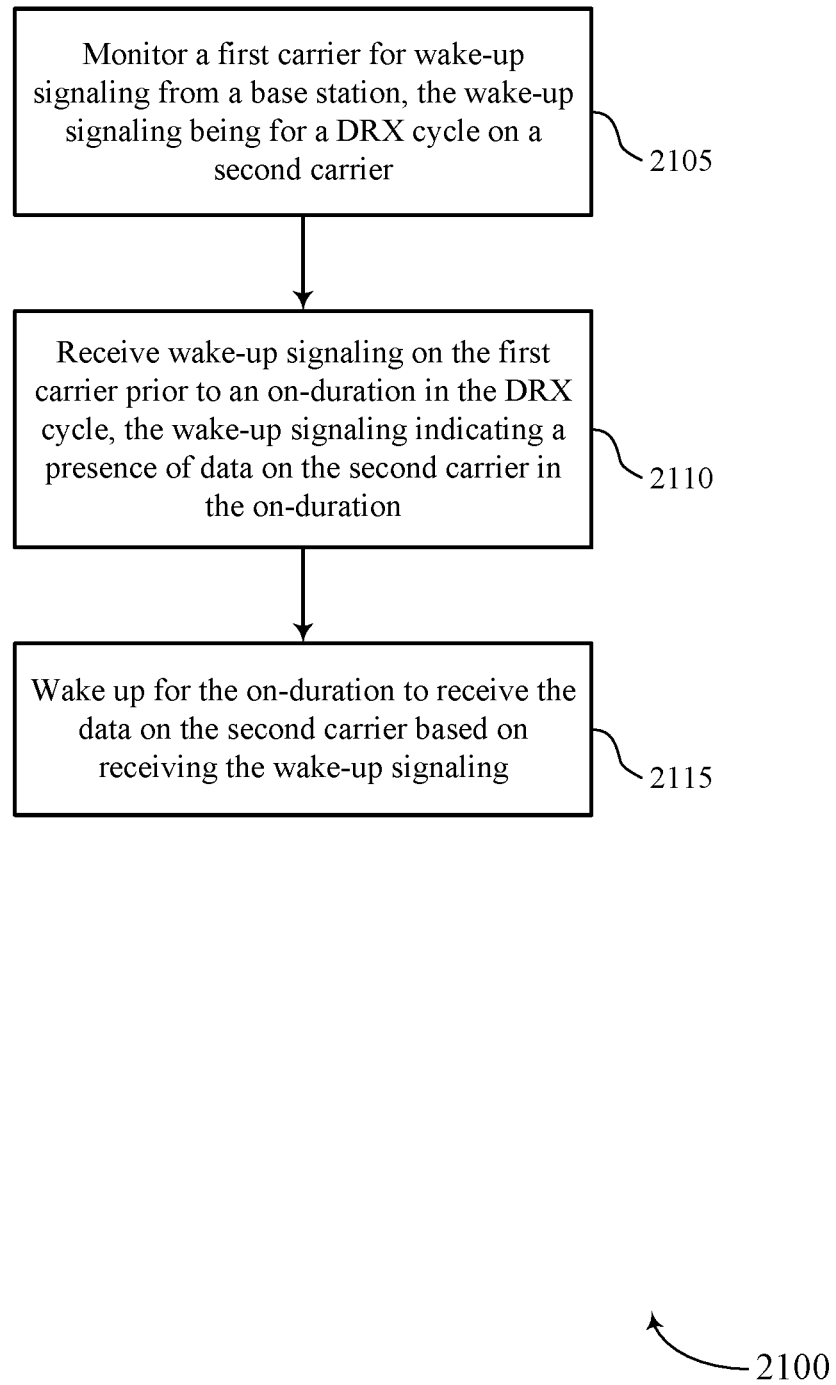
FIGS. 21 and 22 illustrate methods for dual band DRX in accordance with aspects of the present disclosure.

FIG. 21 shows a flowchart illustrating a method 2100 in accordance with aspects of the present disclosure. The operations of method 2100 may be implemented by a UE 115 or its components as described herein. For example, the operations of method 2100 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may monitor a first carrier for wake-up signaling from a base station, the wake-up signaling being for a DRX cycle on a second carrier. The operations of 2105 may be performed according to the methods described herein. In certain examples, aspects of the operations of 2105 may be performed by a carrier manager as described with reference to FIGS. 13 through 16.

At 2110 the UE 115 may receive wake-up signaling on the first carrier prior to an on-duration in the DRX cycle, the wake-up signaling indicating a presence of data on the second carrier in the on-duration. The operations of 2110 may be performed according to the methods described herein. In certain examples, aspects of the operations of 2110 may be performed by a wake-up signaling manager as described with reference to FIGS. 13 through 16.

At 2115 the UE 115 may wake up for the on-duration to receive the data on the second carrier based at least in part on receiving the wake-up signaling. The operations of 2115 may be performed according to the methods described herein. In certain examples, aspects of the operations of 2115 may be performed by a DRX manager as described with reference to FIGS. 13 through 16.

Figure 22:
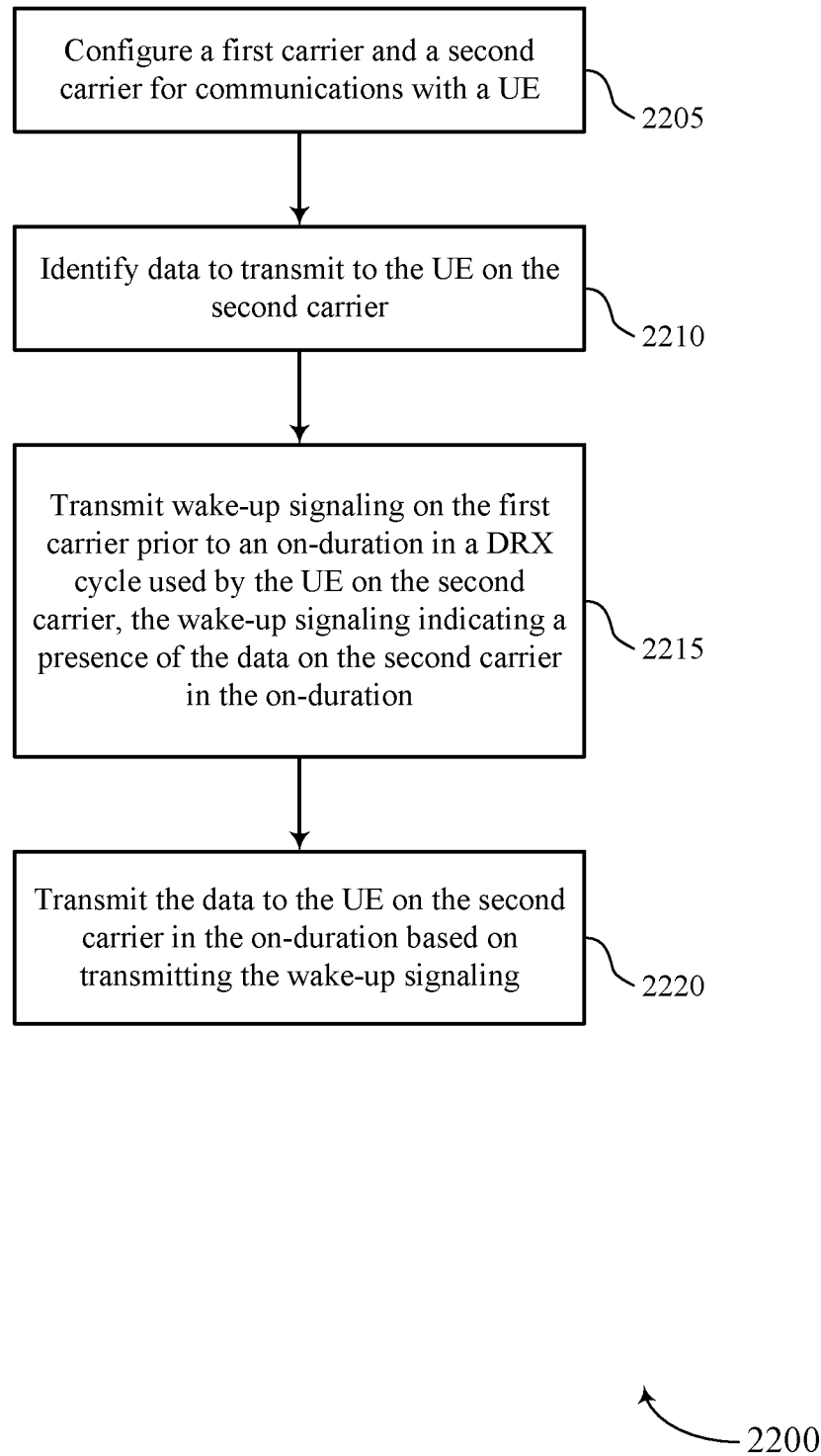

FIG. 22 shows a flowchart illustrating a method 2200 in accordance with aspects of the present disclosure. The operations of method 2200 may be implemented by a base station 105 or its components as described herein. For example, the operations of method 2200 may be performed by a base station communications manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may configure a first carrier and a second carrier for communications with a UE. The operations of 2205 may be performed according to the methods described herein. In certain examples, aspects of the operations of 2205 may be performed by a carrier manager as described with reference to FIGS. 17 through 20.

At 2210 the base station 105 may identify data to transmit to the UE on the second carrier. The operations of 2210 may be performed according to the methods described herein. In certain examples, aspects of the operations of 2210 may be performed by a data manager as described with reference to FIGS. 17 through 20.

At 2215 the base station 105 may transmit wake-up signaling on the first carrier prior to an on-duration in a DRX cycle used by the UE on the second carrier, the wake-up signaling indicating a presence of the data on the second carrier in the on-duration. The operations of 2215 may be performed according to the methods described herein. In certain examples, aspects of the operations of 2215 may be performed by a wake-up signaling manager as described with reference to FIGS. 17 through 20.

At 2220 the base station 105 may transmit the data to the UE on the second carrier in the on-duration based at least in part on transmitting the wake-up signaling. The operations of 2220 may be performed according to the methods described herein. In certain examples, aspects of the operations of 2220 may be performed by a data manager as described with reference to FIGS. 17 through 20.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring a first carrier for wake-up signaling from a base station, the wake-up signaling being for a discontinuous reception (DRX) cycle on a second carrier, wherein the first carrier is in a shared radio frequency spectrum band;
    receiving wake-up signaling on the first carrier prior to an on-duration in the DRX cycle, the wake-up signaling indicating a presence of data on the second carrier in the on-duration;
    receiving an indication of a duration between the wake-up signaling received on the first carrier and the reference signals received on the second carrier;
    receiving reference signals from the base station on the second carrier in the on-duration of the DRX cycle;
    identifying a candidate beam for communications with the base station based at least in part on the received reference signals;
    transmitting an indication of the candidate beam in a measurement report to the base station on uplink resources in the on-duration on the first carrier or the second carrier; and
    waking up for the on-duration to receive the data on the second carrier based at least in part on receiving the wake-up signaling.

2. The method of claim 1, the method further comprising:
    monitoring the first carrier for the wake-up signaling using another DRX cycle.

3. The method of claim 2, further comprising:
    extending an on-duration of the other DRX cycle used to monitor the first carrier for the wake-up signaling based at least in part on the first carrier being in the shared radio frequency spectrum band, wherein monitoring the first carrier for wake-up signaling using the other DRX cycle is based at least in part on the extended on-duration.

4. The method of claim 2, further comprising:
    monitoring the first carrier for control information after receiving the wake-up signaling.

5. The method of claim 4, further comprising:
    extending an on-duration of the other DRX cycle to monitor the first carrier for the control information based at least in part on receiving the wake-up signaling, wherein monitoring the first carrier for the control information is based at least in part on the extended on-duration.

6. The method of claim 5, further comprising:
receiving an indication of one or more control information monitoring occasions, wherein the extending is based at least in part on the indicated one or more control information monitoring occasions.

7. The method of claim 4, further comprising:
transitioning to a sleep mode after receiving the wake-up signaling; and
waking up to monitor the first carrier for the control information based at least in part on receiving the wake-up signaling.

8. The method of claim 7, further comprising:
receiving an indication of one or more control information monitoring occasions, wherein the waking up is based at least in part on the indicated one or more control information monitoring occasions.

9. The method of claim 7, further comprising:
receiving configuration information for a search space associated with the control information, wherein monitoring the first carrier for the control information is based at least in part on the search space.

10. The method of claim 1, further comprising:
receiving signaling indicating an absence of data in a subsequent on-duration; and
avoiding waking up for the subsequent on-duration based at least in part on receiving the signaling indicating the absence of data in the subsequent on-duration.

11. The method of claim 1, further comprising:
failing to receive wake-up signaling on the first carrier prior to a subsequent on-duration in the DRX cycle; and
avoiding waking up for the subsequent on-duration based at least in part on failing to receive the wake-up signaling.

12. The method of claim 1, wherein the reference signals comprise cell-specific reference signals or UE-specific reference signals.

13. The method of claim 1, wherein the on-duration comprises an extended on-duration.

14. A method for wireless communication at a user equipment (UE), comprising:
monitoring a first carrier for wake-up signaling from a base station, the wake-up signaling being for a discontinuous reception (DRX) cycle on a second carrier;
receiving wake-up signaling on the first carrier prior to an on-duration in the DRX cycle, the wake-up signaling indicating a presence of data on the second carrier in the on-duration;
waking up for the on-duration to receive the data on the second carrier based at least in part on receiving the wake-up signaling;
receiving reference signals from the base station on the second carrier in the on-duration of the DRX cycle;
failing to identify a candidate beam for communications with the base station based at least in part on the received reference signals; and
transmitting an indication of the failure to identify the candidate beam to the base station on uplink resources in the on-duration on the first carrier or the second carrier.

15. The method of claim 14, wherein the first carrier or the second carrier used to transmit the indication of the failure to identify the candidate beam is in a shared radio frequency spectrum, the method further comprising:
failing to gain access to a channel to transmit the indication of the failure to identify the candidate beam; and
transmitting the indication of the failure to identify the candidate beam on scheduled or autonomous uplink resources.

16. The method of claim 14, wherein the reference signals comprise cell-specific reference signals or UE-specific reference signals.

17. The method of claim 14, wherein the on-duration comprises an extended on-duration.

18. The method of claim 1, further comprising:
receiving control information on the second carrier that schedules a transmission of the data from the base station on the second carrier in the on-duration.

19. The method of claim 1, further comprising:
receiving control information on the first carrier that schedules a transmission of the data from the base station on the second carrier in the on-duration.

20. The method of claim 1, further comprising:
receiving an indication from the base station to activate the DRX cycle on the second carrier, wherein the indication is received on the first carrier; and
activating the DRX cycle on the second carrier based at least in part on receiving the indication.

21. The method of claim 1, further comprising:
failing to receive wake-up signaling on the first carrier for a predefined duration;
determining that an inactivity timer associated with the DRX cycle has expired based at least in part on failing to receive the wake-up signaling on the first carrier for the predefined duration; and
deactivating the DRX cycle on the second carrier based at least in part on the determination.

22. The method of claim 1, wherein the first carrier is monitored in an active mode or another DRX cycle is used on the first carrier.

23. The method of claim 1, wherein the first carrier comprises a low frequency band carrier and the second carrier comprises a high frequency band carrier.

24. The method of claim 1, wherein the first carrier or the second carrier comprises an unshared radio frequency spectrum band or a shared radio frequency spectrum band.

25. The method of claim 24, wherein the unshared radio frequency spectrum band comprises a radio frequency spectrum band licensed to a single operator, and the shared radio frequency spectrum band comprises a radio frequency spectrum band that is unlicensed, licensed to multiple operators, or licensed to a single operator with opportunistic access by other operators.

26. A method for wireless communication at a base station, comprising:
configuring a first carrier and a second carrier for communications with a user equipment (UE), wherein the first carrier is in a shared radio frequency spectrum band;
identifying data to transmit to the UE on the second carrier;
transmitting wake-up signaling on the first carrier prior to an on-duration in a discontinuous reception (DRX) cycle used by the UE on the second carrier, the wake-up signaling indicating a presence of the data on the second carrier in the on-duration;
transmitting an indication of a duration between the wake-up signaling transmitted on the first carrier and the reference signals transmitted on the second carrier;
transmitting reference signals on the second carrier in the on-duration of the DRX cycle; and receiving an indication of a candidate beam selected by the UE for communications with the base station based at least in part on the reference signals, wherein the indication is received in a measurement report on uplink resources in the on-duration on the first carrier or the second carrier; and transmitting the data to the UE on the second carrier in the on-duration based at least in part on transmitting the wake-up signaling.

27. The method of claim 26, further comprising:
performing a clear channel assessment (CCA) procedure to gain access to a channel on the first carrier for a transmission opportunity for transmitting the wake-up signaling, wherein transmitting the wake-up signaling occurs in the transmission opportunity.

28. The method of claim 27, further comprising:
successfully gaining access to the channel on the first carrier based at least in part on performing the CCA procedure; and
transmitting the wake-up signaling in the channel on the first carrier.

29. The method of claim 27, further comprising:
failing to gain access to the channel on the first carrier;
performing an early CCA procedure to gain access to the channel on the first carrier for a subsequent transmission opportunity for transmitting the wake-up signaling;
successfully gaining access to the channel on the first carrier based at least in part on performing the early CCA procedure; and
transmitting the wake-up signaling in the channel on the first carrier.

30. The method of claim 27, further comprising:
transmitting control information on the first carrier after transmitting the wake-up signaling.

31. The method of claim 30, wherein transmitting the control information comprises:
transmitting the control information in the transmission opportunity used for transmitting the wake-up signaling.

32. The method of claim 30, wherein transmitting the control information comprises:
performing another CCA procedure to gain access to the channel on the first carrier for another transmission opportunity for transmitting the control information; and
transmitting the control information in the other transmission opportunity for transmitting the control information.

33. The method of claim 30, further comprising:
transmitting an indication of control information monitoring occasions to the UE.

34. The method of claim 30, further comprising:
transmitting configuration information for a search space associated with the control information, wherein the control information is transmitted on the first carrier in the search space.

35. The method of claim 26, further comprising:
transmitting signaling indicating an absence of data in a subsequent on-duration.

36. The method of claim 26, wherein the reference signals comprise cell-specific reference signals or UE-specific reference signals.

37. The method of claim 26, wherein the on-duration comprises an extended on-duration.

38. A method for wireless communication at a base station, comprising:

configuring a first carrier and a second carrier for communications with a user equipment (UE);
identifying data to transmit to the UE on the second carrier;
transmitting wake-up signaling on the first carrier prior to an on-duration in a discontinuous reception (DRX) cycle used by the UE on the second carrier, the wake-up signaling indicating a presence of the data on the second carrier in the on-duration;
transmitting the data to the UE on the second carrier in the on-duration based at least in part on transmitting the wake-up signaling;
transmitting reference signals on the second carrier in the on-duration of the DRX cycle; and
receiving an indication that the UE failed to identify a candidate beam for communications with the base station based at least in part on the reference signals, wherein the indication is received on uplink resources in the on-duration on the first carrier or the second carrier.

39. The method of claim 38, wherein the reference signals comprise cell-specific reference signals or UE-specific reference signals.

40. The method of claim 38, wherein the on-duration comprises an extended on-duration.

41. The method of claim 26, further comprising:
transmitting control information on the second carrier that schedules a transmission of the data to the UE on the second carrier in the on-duration.

42. The method of claim 26, further comprising:
transmitting control information on the first carrier that schedules a transmission of the data to the UE on the second carrier in the on-duration.

43. The method of claim 26, further comprising:
transmitting an indication to the UE to activate the DRX cycle on the second carrier, wherein the DRX cycle is activated by the UE based at least in part on the indication.

44. The method of claim 26, wherein the first carrier is monitored by the UE in an active mode or another DRX cycle is used on the first carrier.

45. The method of claim 26, wherein the first carrier comprises a low frequency band carrier and the second carrier comprises a high frequency band carrier.

46. The method of claim 26, wherein the first carrier or the second carrier comprises an unshared radio frequency spectrum band or a shared radio frequency spectrum band.

47. The method of claim 46, wherein the unshared radio frequency spectrum band comprises a radio frequency spectrum band licensed to a single operator, and the shared radio frequency spectrum band comprises a radio frequency spectrum band that is unlicensed, licensed to multiple operators, or licensed to a single operator with opportunistic access by other operators.

48. An apparatus for wireless communication at a user equipment (UE), comprising:
means for monitoring a first carrier for wake-up signaling from a base station, the wake-up signaling being for a discontinuous reception (DRX) cycle on a second carrier, wherein the first carrier is in a shared radio frequency spectrum band;
means for receiving wake-up signaling on the first carrier prior to an on-duration in the DRX cycle, the wake-up signaling indicating a presence of data on the second carrier in the on-duration;

means for receiving an indication of a duration between the wake-up signaling received on the first carrier and the reference signals received on the second carrier;

means for receiving reference signals from the base station on the second carrier in the on-duration of the DRX cycle;

means for identifying a candidate beam for communications with the base station based at least in part on the received reference signals;

means for transmitting an indication of the candidate beam in a measurement report to the base station on uplink resources in the on-duration on the first carrier or the second carrier; and means for waking up for the on-duration to receive the data on the second carrier based at least in part on receiving the wake-up signaling.

49. An apparatus for wireless communication at a base station, comprising:

means for configuring a first carrier and a second carrier for communications with a user equipment (UE), wherein the first carrier is in a shared radio frequency spectrum band;

means for identifying data to transmit to the UE on the second carrier;

means for transmitting wake-up signaling on the first carrier prior to an on-duration in a discontinuous reception (DRX) cycle used by the UE on the second carrier, the wake-up signaling indicating a presence of the data on the second carrier in the on-duration;

means for transmitting an indication of a duration between the wake-up signaling transmitted on the first carrier and the reference signals transmitted on the second carrier;

means for transmitting reference signals on the second carrier in the on-duration of the DRX cycle; and means for receiving an indication of a candidate beam selected by the UE for communications with the base station based at least in part on the reference signals, wherein the indication is received in a measurement report on uplink resources in the on-duration on the first carrier or the second carrier; and means for transmitting the data to the UE on the second carrier in the on-duration based at least in part on transmitting the wake-up signaling.

50. An apparatus for wireless communication at a user equipment (UE), comprising:

a processor;

memory in electronic communication with the processor; and instructions stored in the memory and executable by the processor to cause the apparatus to:

monitor a first carrier for wake-up signaling from a base station, the wake-up signaling being for a discontinuous reception (DRX) cycle on a second carrier, wherein the first carrier is in a shared radio frequency spectrum band;

receive wake-up signaling on the first carrier prior to an on-duration in the DRX cycle, the wake-up signaling indicating a presence of data on the second carrier in the on-duration;

receive an indication of a duration between the wake-up signaling received on the first carrier and the reference signals received on the second carrier;

receive reference signals from the base station on the second carrier in the on-duration of the DRX cycle;

identify a candidate beam for communications with the base station based at least in part on the received reference signals;

transmit an indication of the candidate beam in a measurement report to the base station on uplink resources in the on-duration on the first carrier or the second carrier; and wake up for the on-duration to receive the data on the second carrier based at least in part on receiving the wake-up signaling.

51. The apparatus of claim 50, and wherein the instructions are further executable by the processor to cause the apparatus to:

monitor the first carrier for the wake-up signaling using another DRX cycle.

52. The apparatus of claim 51, wherein the instructions are further executable by the processor to cause the apparatus to:

extend an on-duration of the other DRX cycle used to monitor the first carrier for the wake-up signaling based at least in part on the first carrier being in the shared radio frequency spectrum band, wherein monitoring the first carrier for wake-up signaling using the other DRX cycle is based at least in part on the extended on-duration.

53. The apparatus of claim 51, wherein the instructions are further executable by the processor to cause the apparatus to:

monitor the first carrier for control information after receiving the wake-up signaling.

54. The apparatus of claim 53, wherein the instructions are further executable by the processor to cause the apparatus to:

extend an on-duration of the other DRX cycle to monitor the first carrier for the control information based at least in part on receiving the wake-up signaling, wherein monitoring the first carrier for the control information is based at least in part on the extended on-duration.

55. The apparatus of claim 54, further comprising a receiver, wherein the instructions are further executable by the processor to cause the apparatus to:

receive, via the receiver, an indication of one or more control information monitoring occasions, wherein the extending is based at least in part on the indicated one or more control information monitoring occasions.

56. The apparatus of claim 53, wherein the instructions are further executable by the processor to cause the apparatus to:

transition to a sleep mode after receiving the wake-up signaling; and wake up to monitor the first carrier for the control information based at least in part on receiving the wake-up signaling.

57. The apparatus of claim 56, wherein the instructions are further executable by the processor to cause the apparatus to:

receive an indication of one or more control information monitoring occasions, wherein the waking up is based at least in part on the indicated one or more control information monitoring occasions.

58. The apparatus of claim 56, wherein the instructions are further executable by the processor to cause the apparatus to:

receive configuration information for a search space associated with the control information, wherein monitoring the first carrier for the control information is based at least in part on the search space.

59. The apparatus of claim 50, wherein the instructions are further executable by the processor to cause the apparatus to:

receive signaling indicating an absence of data in a subsequent on-duration; and
avoid waking up for the subsequent on-duration based at least in part on receiving the signaling indicating the absence of data in the subsequent on-duration.

60. The apparatus of claim 50, wherein the instructions are further executable by the processor to cause the apparatus to:
fail to receive wake-up signaling on the first carrier prior to a subsequent on-duration in the DRX cycle; and
avoid waking up for the subsequent on-duration based at least in part on failing to receive the wake-up signaling.

61. The apparatus of claim 50, wherein the reference signals comprise cell-specific reference signals or UE-specific reference signals.

62. The apparatus of claim 50, wherein the on-duration comprises an extended on-duration.

63. An apparatus for wireless communication at a user equipment (UE), comprising:
a processor;
memory in electronic communication with the processor; and
instructions stored in the memory and executable by the processor to cause the apparatus to:
monitor a first carrier for wake-up signaling from a base station, the wake-up signaling being for a discontinuous reception (DRX) cycle on a second carrier;
receive wake-up signaling on the first carrier prior to an on-duration in the DRX cycle, the wake-up signaling indicating a presence of data on the second carrier in the on-duration;
wake up for the on-duration to receive the data on the second carrier based at least in part on receiving the wake-up signaling;
receive reference signals from the base station on the second carrier in the on-duration of the DRX cycle;
fail to identify a candidate beam for communications with the base station based at least in part on the received reference signals; and
transmit an indication of the failure to identify the candidate beam to the base station on uplink resources in the on-duration on the first carrier or the second carrier.

64. The apparatus of claim 50, wherein the first carrier or the second carrier used to transmit the indication of the failure to identify the candidate beam is in a shared radio frequency spectrum, and wherein the instructions are further executable by the processor to cause the apparatus to:
fail to gain access to a channel to transmit the indication of the failure to identify the candidate beam; and
transmit the indication of the failure to identify the candidate beam on scheduled or autonomous uplink resources.

65. The apparatus of claim 63, wherein the reference signals comprise cell-specific reference signals or UE-specific reference signals.

66. The apparatus of claim 63, wherein the on-duration comprises an extended on-duration.

67. The apparatus of claim 50, wherein the instructions are further executable by the processor to cause the apparatus to:
receive control information on the second carrier that schedules a transmission of the data from the base station on the second carrier in the on-duration.

68. The apparatus of claim 50, wherein the instructions are further executable by the processor to cause the apparatus to:
receive control information on the first carrier that schedules a transmission of the data from the base station on the second carrier in the on-duration.

69. The apparatus of claim 50, wherein the instructions are further executable by the processor to cause the apparatus to:
receive an indication from the base station to activate the DRX cycle on the second carrier, wherein the indication is received on the first carrier; and
activate the DRX cycle on the second carrier based at least in part on receiving the indication.

70. The apparatus of claim 50, wherein the instructions are further executable by the processor to cause the apparatus to:
fail to receive wake-up signaling on the first carrier for a predefined duration;
determine that an inactivity timer associated with the DRX cycle has expired based at least in part on failing to receive the wake-up signaling on the first carrier for the predefined duration; and
deactivate the DRX cycle on the second carrier based at least in part on the determination.

71. The apparatus of claim 50, wherein the first carrier is monitored in an active mode or another DRX cycle is used on the first carrier.

72. The apparatus of claim 50, wherein the first carrier comprises a low frequency band carrier and the second carrier comprises a high frequency band carrier.

73. The apparatus of claim 50, wherein the first carrier or the second carrier comprises an unshared radio frequency spectrum band or a shared radio frequency spectrum band.

74. The apparatus of claim 73, wherein the unshared radio frequency spectrum band comprises a radio frequency spectrum band licensed to a single operator, and the shared radio frequency spectrum band comprises a radio frequency spectrum band that is unlicensed, licensed to multiple operators, or licensed to a single operator with opportunistic access by other operators.

75. An apparatus for wireless communication at a base station, comprising:
a processor;
memory in electronic communication with the processor; and
instructions stored in the memory and executable by the processor to cause the apparatus to:
configure a first carrier and a second carrier for communications with a user equipment (UE), wherein the first carrier is in a shared radio frequency spectrum band;
identify data to transmit to the UE on the second carrier;
transmit wake-up signaling on the first carrier prior to an on-duration in a discontinuous reception (DRX) cycle used by the UE on the second carrier, the wake-up signaling indicating a presence of the data on the second carrier in the on-duration;
transmit an indication of a duration between the wake-up signaling transmitted on the first carrier and the reference signals transmitted on the second carrier;
transmit reference signals on the second carrier in the on-duration of the DRX cycle; and
receive an indication of a candidate beam selected by the UE for communications with the base station based at least in part on the reference signals, wherein the indication is received in a measurement report on uplink resources in the on-duration on the first carrier or the second carrier; and
transmit the data to the UE on the second carrier in the on-duration based at least in part on transmitting the wake-up signaling.

76. The apparatus of claim 75, wherein the instructions are further executable by the processor to cause the apparatus to:
  perform a clear channel assessment (CCA) procedure to gain access to a channel on the first carrier for a transmission opportunity for transmitting the wake-up signaling, wherein transmitting the wake-up signaling occurs in the transmission opportunity.

77. The apparatus of claim 76, further comprising a transmitter, wherein the instructions are further executable by the processor to cause the apparatus to:
  successfully gain access to the channel on the first carrier based at least in part on performing the CCA procedure; and
  transmit, via the transmitter, the wake-up signaling in the channel on the first carrier.

78. The apparatus of claim 76, wherein the instructions are further executable by the processor to cause the apparatus to:
  fail to gain access to the channel on the first carrier;
  perform an early CCA procedure to gain access to the channel on the first carrier for a subsequent transmission opportunity for transmitting the wake-up signaling;
  successfully gain access to the channel on the first carrier based at least in part on performing the early CCA procedure; and
  transmit the wake-up signaling in the channel on the first carrier.

79. The apparatus of claim 76, wherein the instructions are further executable by the processor to cause the apparatus to:
  transmit control information on the first carrier after transmitting the wake-up signaling.

80. The apparatus of claim 79, wherein the instructions are further executable by the processor to cause the apparatus to:
  transmit the control information in the transmission opportunity used for transmitting the wake-up signaling.

81. The apparatus of claim 79, wherein the instructions are further executable by the processor to cause the apparatus to:
  perform another CCA procedure to gain access to the channel on the first carrier for another transmission opportunity for transmitting the control information; and
  transmit the control information in the other transmission opportunity for transmitting the control information.

82. The apparatus of claim 79, wherein the instructions are further executable by the processor to cause the apparatus to:
  transmit an indication of control information monitoring occasions to the UE.

83. The apparatus of claim 79, wherein the instructions are further executable by the processor to cause the apparatus to:
  transmit configuration information for a search space associated with the control information, wherein the control information is transmitted on the first carrier in the search space.

84. The apparatus of claim 75, wherein the instructions are further executable by the processor to cause the apparatus to:
  transmit signaling indicating an absence of data in a subsequent on-duration.

85. The apparatus of claim 75, wherein the reference signals comprise cell-specific reference signals or UE-specific reference signals.

86. The apparatus of claim 75, wherein the on-duration comprises an extended on-duration.

87. An apparatus for wireless communication at a base station, comprising:
  a processor;
  memory in electronic communication with the processor; and
  instructions stored in the memory and executable by the processor to cause the apparatus to:
  configure a first carrier and a second carrier for communications with a user equipment (UE);
  identify data to transmit to the UE on the second carrier;
  transmit wake-up signaling on the first carrier prior to an on-duration in a discontinuous reception (DRX) cycle used by the UE on the second carrier, the wake-up signaling indicating a presence of the data on the second carrier in the on-duration; and
  transmit the data to the UE on the second carrier in the on-duration based at least in part on transmitting the wake-up signaling;
  transmit reference signals on the second carrier in the on-duration of the DRX cycle; and
  receive an indication that the UE failed to identify a candidate beam for communications with the base station based at least in part on the reference signals, wherein the indication is received on uplink resources in the on-duration on the first carrier or the second carrier.

88. The apparatus of claim 87, wherein the reference signals comprise cell-specific reference signals or UE-specific reference signals.

89. The apparatus of claim 87, wherein the on-duration comprises an extended on-duration.

90. The apparatus of claim 75, wherein the instructions are further executable by the processor to cause the apparatus to:
  transmit control information on the second carrier that schedules a transmission of the data to the UE on the second carrier in the on-duration.

91. The apparatus of claim 75, wherein the instructions are further executable by the processor to cause the apparatus to:
  transmit control information on the first carrier that schedules a transmission of the data to the UE on the second carrier in the on-duration.

92. The apparatus of claim 75, wherein the instructions are further executable by the processor to cause the apparatus to:
  transmit an indication to the UE to activate the DRX cycle on the second carrier, wherein the DRX cycle is activated by the UE based at least in part on the indication.

93. The apparatus of claim 75, wherein the first carrier is monitored by the UE in an active mode or another DRX cycle is used on the first carrier.

94. The apparatus of claim 75, wherein the first carrier comprises a low frequency band carrier and the second carrier comprises a high frequency band carrier.

95. The apparatus of claim 75, wherein the first carrier or the second carrier comprises an unshared radio frequency spectrum band or a shared radio frequency spectrum band.

96. The apparatus of claim 95, wherein the unshared radio frequency spectrum band comprises a radio frequency spectrum band licensed to a single operator, and the shared radio frequency spectrum band comprises a radio frequency spectrum band that is unlicensed, licensed to multiple operators, or licensed to a single operator with opportunistic access by other operators.

97. A non-transitory computer-readable medium storing code for wireless communication at a user equipment (UE), the code comprising instructions executable by a processor to:
monitor a first carrier for wake-up signaling from a base station, the wake-up signaling being for a discontinuous reception (DRX) cycle on a second carrier, wherein the first carrier is in a shared radio frequency spectrum band;
receive wake-up signaling on the first carrier prior to an on-duration in the DRX cycle, the wake-up signaling indicating a presence of data on the second carrier in the on-duration;
receive an indication of a duration between the wake-up signaling received on the first carrier and the reference signals received on the second carrier;
receive reference signals from the base station on the second carrier in the on-duration of the DRX cycle;
identify a candidate beam for communications with the base station based at least in part on the received reference signals;
transmit an indication of the candidate beam in a measurement report to the base station on uplink resources in the on-duration on the first carrier or the second carrier; and
wake up for the on-duration to receive the data on the second carrier based at least in part on receiving the wake-up signaling.

98. A non-transitory computer-readable medium storing code for wireless communication at a base station, the code comprising instructions executable by a processor to:
configure a first carrier and a second carrier for communications with a user equipment (UE) wherein the first carrier is in a shared radio frequency spectrum band;
identify data to transmit to the UE on the second carrier;
transmit wake-up signaling on the first carrier prior to an on-duration in a discontinuous reception (DRX) cycle used by the UE on the second carrier, the wake-up signaling indicating a presence of the data on the second carrier in the on-duration;
transmit an indication of a duration between the wake-up signaling transmitted on the first carrier and the reference signals transmitted on the second carrier;
transmit reference signals on the second carrier in the on-duration of the DRX cycle; and
receive an indication of a candidate beam selected by the UE for communications with the base station based at least in part on the reference signals, wherein the indication is received in a measurement report on uplink resources in the on-duration on the first carrier or the second carrier; and
transmit the data to the UE on the second carrier in the on-duration based at least in part on transmitting the wake-up signaling.

* * * * *